United States Patent
Mori et al.

(10) Patent No.: US 7,936,381 B2
(45) Date of Patent: May 3, 2011

(54) MANAGEMENT AND SETTING OF PHOTOGRAPHING CONDITION OF IMAGE SENSING APPARATUS

(75) Inventors: Kurumi Mori, Kawasaki (JP); Mikihiro Fujimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1013 days.

(21) Appl. No.: 11/239,796

(22) Filed: Sep. 29, 2005

(65) Prior Publication Data
US 2006/0028553 A1 Feb. 9, 2006

Related U.S. Application Data

(62) Division of application No. 09/425,767, filed on Oct. 22, 1999, now abandoned.

(30) Foreign Application Priority Data

Oct. 30, 1998 (JP) .................................... 10-311326
Nov. 25, 1998 (JP) .................................... 10-333839

(51) Int. Cl.
*H04N 5/76* (2006.01)
*H04N 5/228* (2006.01)
(52) U.S. Cl. ............... 348/231.6; 348/222.1; 348/231.3; 348/231.9
(58) Field of Classification Search ............. 348/231.99, 348/231.1, 231.2, 231.3, 231.5, 231.6, 231.9, 348/239, 333.01, 333.02, 333.04, 333.05, 348/333.11, 333.12, 211.99, 211.5, 211.6, 348/211.9, 211.11, 211.12, 211.13, 211.14
See application file for complete search history.

(56) References Cited

U.S. PATENT DOCUMENTS

| | | | | |
|---|---|---|---|---|
| 4,866,511 A | * | 9/1989 | Belmares-Sarabia et al. | 348/650 |
| 5,473,370 A | * | 12/1995 | Moronaga et al. | 348/231.1 |
| 5,796,429 A | | 8/1998 | Suzuki et al. | |
| 5,845,044 A | * | 12/1998 | Iizuka et al. | 386/117 |
| 5,886,753 A | | 3/1999 | Shinyagaito et al. | |
| 6,005,613 A | | 12/1999 | Endsley et al. | |
| 6,035,323 A | | 3/2000 | Narayen et al. | |
| 6,201,571 B1 | | 3/2001 | Ota | |
| 6,239,836 B1 | | 5/2001 | Suzuki et al. | |
| 6,307,550 B1 | | 10/2001 | Chen et al. | |
| 6,335,742 B1 | * | 1/2002 | Takemoto | 715/781 |
| 6,337,928 B1 | | 1/2002 | Takahashi et al. | |
| 6,532,039 B2 | | 3/2003 | Anderson | |
| 6,567,121 B1 | | 5/2003 | Kuno | |
| 6,597,392 B1 | | 7/2003 | Jenkins et al. | |
| 2001/0015760 A1 | | 8/2001 | Fellegara et al. | |
| 2003/0038886 A1 | | 2/2003 | Fujii et al. | |

FOREIGN PATENT DOCUMENTS

| | | |
|---|---|---|
| JP | 05-252432 | 9/1993 |
| JP | 09-098373 | 4/1997 |
| JP | 10-178584 | 6/1998 |

* cited by examiner

*Primary Examiner* — Tuan Ho
*Assistant Examiner* — Peter Chon
(74) *Attorney, Agent, or Firm* — Cowan, Liebowitz & Latman, P.C.

(57) ABSTRACT

According to a method of managing photographing conditions for an image sensing apparatus, one of images photographed by the image sensing apparatus is selected. The selected image, photographing conditions such as the exposure value and shutter speed in photographing the image, and a separately input photographing status such as the photographing place are stored in association with each other.

2 Claims, 44 Drawing Sheets

CABLE CROSS SECTION

EXCLUSIVE-OR OF Data AND Strobe

BRANCH : NODE TO WHICH TWO OR MORE NODES ARE CONNECTED

LEAF : NODE HAVING ONLY ONE PORT CONNECTED

□ : PORTS
c : PORT THAT CORRESPONDS TO NODE OF CHILD
p : PORT THAT CORRESPONDS TO NODE OF PARENT

FIG. 26

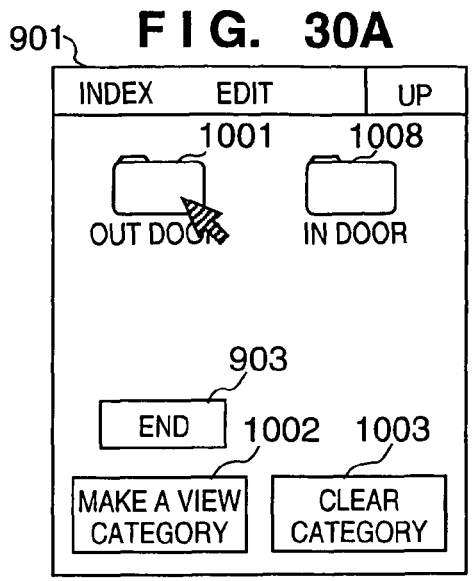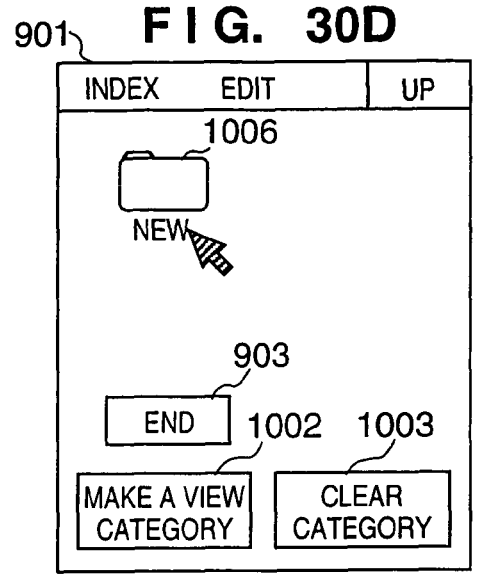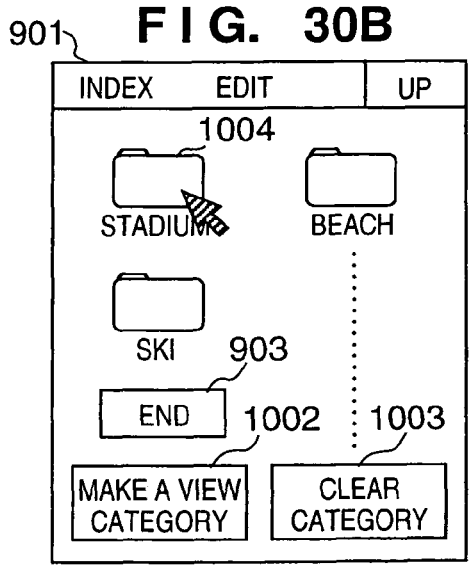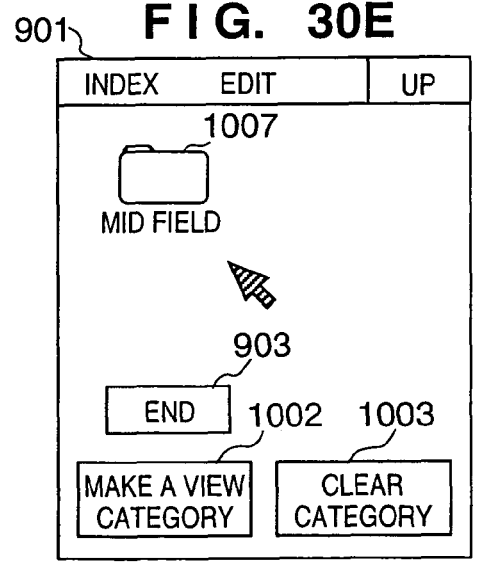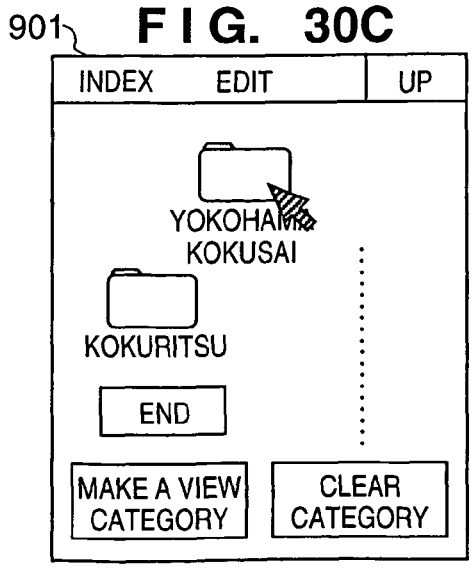

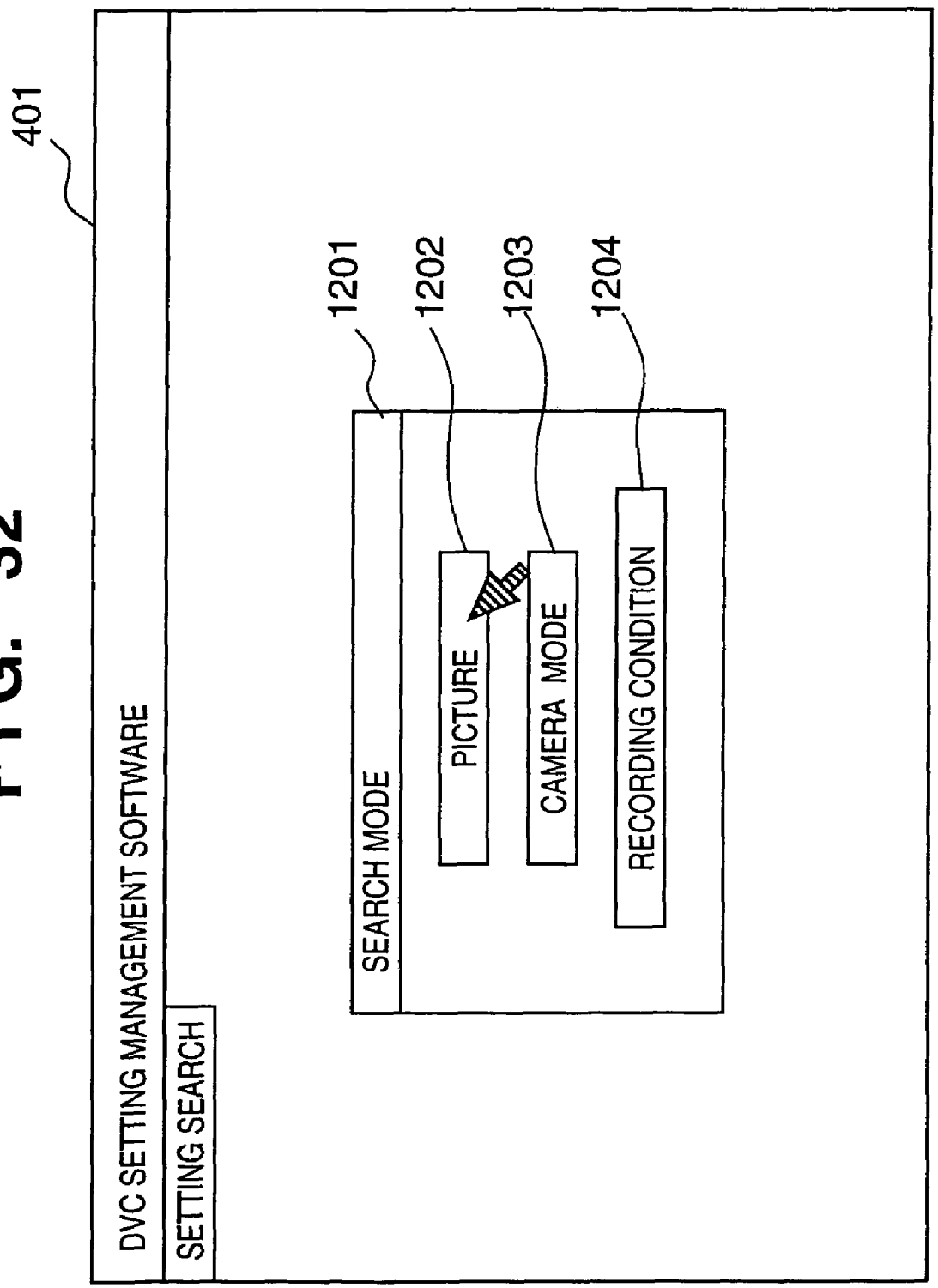

FIG. 34A

| | |
|---|---|
| TAPE | NON SETTING |
| C. MODE | NON SETTING |
| D. ZOOM | NON SETTING |
| F | NON SETTING |
| SHUTTER | NON SETTING |
| AF | NON SETTING |
| AGC | NON SETTING |
| W.B. | NON SETTING |
| D. EFFECT | NON SETTING |
| ND | NON SETTING |
| DATE | NON SETTING |

C.M. SEARCH — BACK
CLEAR — SEARCH

FIG. 34B

R.C. SEARCH — BACK

| | |
|---|---|
| PLACE | NON SETTING |
| DATE 1 | NON SETTING |
| DATE 2 | NON SETTING |
| MOVING | NON SETTING |
| SHUTTER | NON SETTING |
| WHO / WHAT | NON SETTING |
| W / T | NON SETTING |
| WEATHER | NON SETTING |
| CAMERA ID | NON SETTING |
| ⋮ | NON SETTING |
| ⋮ | NON SETTING |
| ⋮ | NON SETTING |
| ⋮ | NON SETTING |

CLEAR — SEARCH

FIG. 34C

RESULT AND SELECT — BACK

FOUND 3 MATCHES

| TAPE | SP |
|---|---|
| SHUTTER | 1/60 |

SAMPLE 1   SAMPLE 4   SAMPLE 6

FIG. 35A

| RESULT | SAMPLE 1 | BACK |

| PLACE | YOKOHAMA KOKUSAI |
| DATE 1 | SPRING | JUNE |
| DATE 2 | 15:00 |
| MOVING | ACTIVE |
| WHO / WHAT | SPORTS GAME |
| W / T | T |
| WEATHER | GOOD |
| CAMERA ID | 123456 |

CAMERA SETTING

| TAPE | SP |
| C. MODE | AUTO |
| D. ZOOM | ON |
| F | 1.8 |
| SHUTTER | 1/60 |
| AF | ON |
| AGC | 0dB |
| W.B. | AUTO |
| D.EFFECT | OFF |
| ND | OFF |
| DATE | 1998.06.16 |

BACK TO SEARCH WINDOW

FIG. 35B

| TRANSPORT SETTINGS | CANCEL |

| TAPE | SP | → | X |
| C. MODE | AUTO | → | X |
| D. ZOOM | ON | → | X |
| F | 1.8 | → | X |
| SHUTTER | 1/60 | → | X |
| AF | ON | → | X |
| AGC | 0dB | → | X |
| W.B. | AUTO | → | X |
| D. EFFECT | OFF | → | X |
| ND | OFF | → | X |

TRANS ALL

RESET

START TRANSPORT

F I G. 43
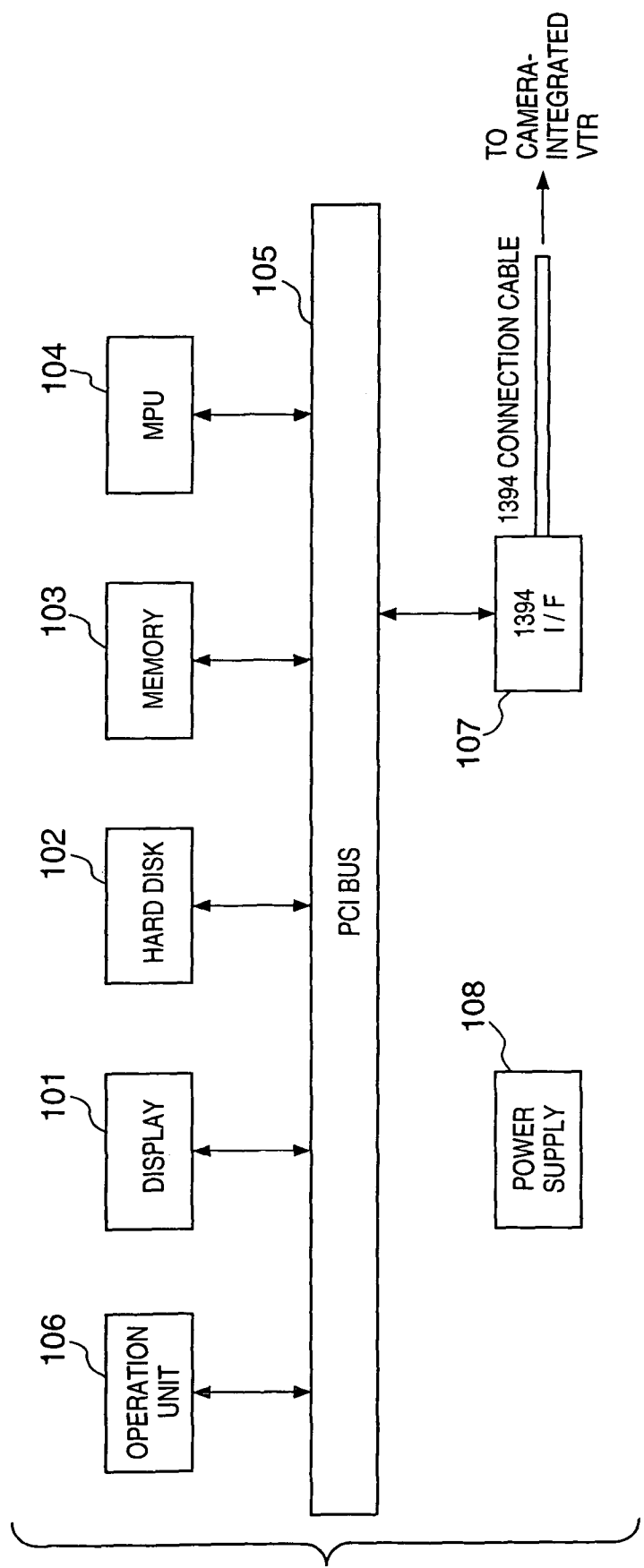

MANAGEMENT AND SETTING OF PHOTOGRAPHING CONDITION OF IMAGE SENSING APPARATUS

This is a divisional application of application Ser. No. 09/425,767 filed on Oct. 22, 1999 now abandoned.

BACKGROUND OF THE INVENTION

The present invention relates to an image sensing apparatus, image sensing system, and image sensing apparatus control method and, more particularly, to management and setting of the photographing condition used in the image sensing apparatus.

Conventionally, when a video camera performs video photographing, control values (to be referred to as "camera control values" hereinafter) such as the exposure value, shutter speed, and white balance must be appropriately set. This work is very cumbersome for a user who is a beginner. To facilitate photographing for anyone, some of recent consumer video cameras prepare an automatic setting mode in which the camera control values are automatically set. For example, camera control data is set to allow even a beginner to take a picture without any failure under almost all photographing conditions, e.g., a wedding hall where the illumination is dark, a very bright place such as a skiing ground or beach, or a sport in which an object to be photographed moves actively. Such video cameras also prepare other modes such as a program automatic exposure (AE) mode in order to cope with a special photographing condition.

Photographing in the program AE mode will be exemplified. In normal automatic exposure control, the exposure value is controlled based on data obtained by averaging the brightness of a predetermined area within a photographing range. Photographing in a bright background results in underexposure, and photographing in a dark background results in overexposure. For example, when a person is photographed in a skiing ground on a fine day, the background is very bright owing to reflection of the sunlight by snow, and thus the person is photographed dark by normal exposure setting. To prevent this, the surf & snow mode as one of the program AE modes changes the exposure setting value and the like so as to attain overexposure in comparison with normal exposure settings.

In this manner, each camera manufacturer devises to allow even a beginner to take a picture without any failure. However, a skilled user cannot be satisfied by settings by the automatic setting mode and requires manual settings because the user wants to obtain a better work by photographing under unique settings.

However, setting work is cumbersome. In addition, a plurality of sets of camera control values set in accordance with the photographing condition cannot be stored. Every time the photographing condition changes, the user must set the camera control values in accordance with the photographing condition.

Further, recent devices are downsized, which makes it difficult to manipulate the operation keys of the main bodies.

SUMMARY OF THE INVENTION

The present invention has been made in consideration of the above situation, and has as its object to facilitate of setting photographing conditions suited to different photographing statuses and facilitate photographing under each photographing condition.

According to the present invention, the foregoing object is attained by providing a method of managing a photographing condition of an image sensing apparatus, comprising: the image selection step of selecting one of not less than one image photographed by the image sensing apparatus; and the first storage step of storing the image selected in the image selection step and a photographing condition in photographing the image, in association with each other.

According to the present invention, the foregoing object is also attained by providing a method of setting a photographing condition in an image sensing apparatus, comprising: the condition selection step of selecting a desired photographing condition from photographing conditions in photographing respective images that are stored in association with not less than one image stored in a storage medium; and the transfer step of transferring the photographing condition selected in the condition selection step to the image sensing apparatus.

Further, the foregoing object is also attained by providing a method of setting a photographing condition of an image sensing apparatus, comprising: the display step of displaying a plurality of arbitrary photographing conditions stored in a storage medium; the condition selection step of selecting a desired photographing condition from the plurality of photographing conditions displayed in the display step; and the setting step of setting the photographing condition selected in the condition selection step in the image sensing apparatus.

Furthermore, the foregoing object is also attained by providing an image sensing apparatus comprising: image selection means for selecting one of not less than one image photographed by the image sensing apparatus; and storage means for storing the image selected by said image selection means and a photographing condition in photographing the image, in association with each other.

Further, the foregoing object is also attained by providing a control apparatus for controlling an image sensing apparatus, comprising: image selection means for selecting one of not less than one image photographed by the image sensing apparatus; and storage means for storing the image selected by the image selection means and a photographing condition in photographing the image, in association with each other.

Further, the foregoing object is also attained by providing a control apparatus for controlling an image sensing apparatus, comprising: condition selection means for selecting a desired photographing condition from photographing conditions in photographing respective images that are stored in association with not less than one image stored in a storage medium; and transfer means for transferring the photographing condition selected by the condition selection means to the image sensing apparatus.

Further, the foregoing object is also attained by providing an image sensing apparatus comprising: display means for displaying a plurality of arbitrary photographing conditions stored in a storage medium; condition selection means for selecting a desired photographing condition from the plurality of photographing conditions displayed by the display means; and setting means for setting the photographing condition selected by the condition selection means in the image sensing apparatus.

Further, the foregoing object is also attained by providing a control apparatus for controlling an image sensing apparatus, comprising: display means for displaying a plurality of arbitrary photographing conditions stored in a storage medium; condition selection means for selecting a desired photographing condition from the plurality of photographing conditions displayed by the display means; and setting means for transferring the photographing condition selected by the condition selection means to the image sensing apparatus.

Further, the foregoing object is also attained by providing a computer readable program for managing a photographing condition of an image sensing apparatus, comprising: a first computer readable code for selecting one of not less than one image photographed by the image sensing apparatus; and a second computer readable code for storing the selected image and a photographing condition in photographing the image, in association with each other.

Further, the foregoing object is also attained by providing a computer readable program for setting a photographing condition in an image sensing apparatus, comprising: a first computer readable code for selecting a desired photographing condition from photographing conditions in photographing respective images that are stored in association with not less than one image stored in a storage medium; and a second computer readable code for transferring the selected photographing condition to the image sensing apparatus.

Further, the foregoing object is also attained by providing a computer readable code for setting a photographing condition of an image sensing apparatus, comprising: a first computer readable code for displaying a plurality of arbitrary photographing conditions stored in a storage medium; a second computer readable code for selecting a desired photographing condition from the plurality of displayed photographing conditions; and a third computer readable code for setting the selected photographing condition in the image sensing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 26 is a view showing a display example of a setting window after setting the photographing status;

FIGS. 30A to 30E are views useful in describing a photographing status item edit method;

FIG. 32 is a view showing a display example of a search window;

FIGS. 34A to 34C are views respectively showing a search window based the photographing condition, a search window based on the photographing status, and a search result selection window for displaying a sample suitable for a search;

FIGS. 35A and 35B are views useful in describing a transport request for a searched photographing condition, selection of a photographing condition to be transported, and a transport start request method in the second embodiment of the present invention;

FIG. 43 is a block diagram showing a personal computer in the fourth embodiment of the present invention.

DETAILED DESCRIPTION OF THE PREFERRED EMBODIMENTS

Preferred embodiments of the present invention will be described in detail in accordance with the accompanying drawings.

First Embodiment

The first embodiment of the present invention will exemplify a system for managing the photographing condition when video information recorded on a magnetic tape or the like is photographed. Constructing this system by a single digital video camera requires a memory capacity for storing the photographing condition, a system including software and hardware for creating the libraries of recorded photographing conditions, and the like. This increases the volume of the digital video camera itself, resulting in a heavy processing load.

Considering the recent stream of reducing the size, weight, and cost of digital video cameras, it is undesirable to construct such system by a single digital video camera. To meet these demands, there is proposed a system which communicates video information and photographing condition information with a personal computer (to be referred to as a PC) or the like via a digital I/F to manage the photographing condition on the PC side.

At present, communication between the digital video camera and PC often uses an IEEE 1394 serial bus. According some of the characteristic features of the IEEE 1394 serial bus, the cable is relatively thin and flexible, and the connector is smaller than that of a conventional SCSI cable because high-speed serial communication is adopted. Further, large-capacity data such as image information can be transferred at a high speed together with device control data.

More specifically, communication using the IEEE 1394 I/F can greatly reduce cumbersome work compared to conventional communication even when connecting a mobile or portable device such as a digital camera or video camera which is not generally installed. Moreover, this communication can smoothly transfer image information to the PC.

The IEEE 1394 serial bus will be explained.

<Overview of IEEE-1394 Technology>

The appearance of digital VTRs and DVDs for home use has been accompanied by the need for support when transferring video and audio data in real time and in great quantity in terms of the information contained. An interface capable of high-speed data transfer is required to transfer audio and video data in real time and load the data in a personal computer or transfer it to another digital device. An interface that has been developed in view of the foregoing is the High-Performance Serial Bus in compliance with IEEE 1394-1995. This bus will be referred to as a "1394 serial bus" below.

Figure 1:
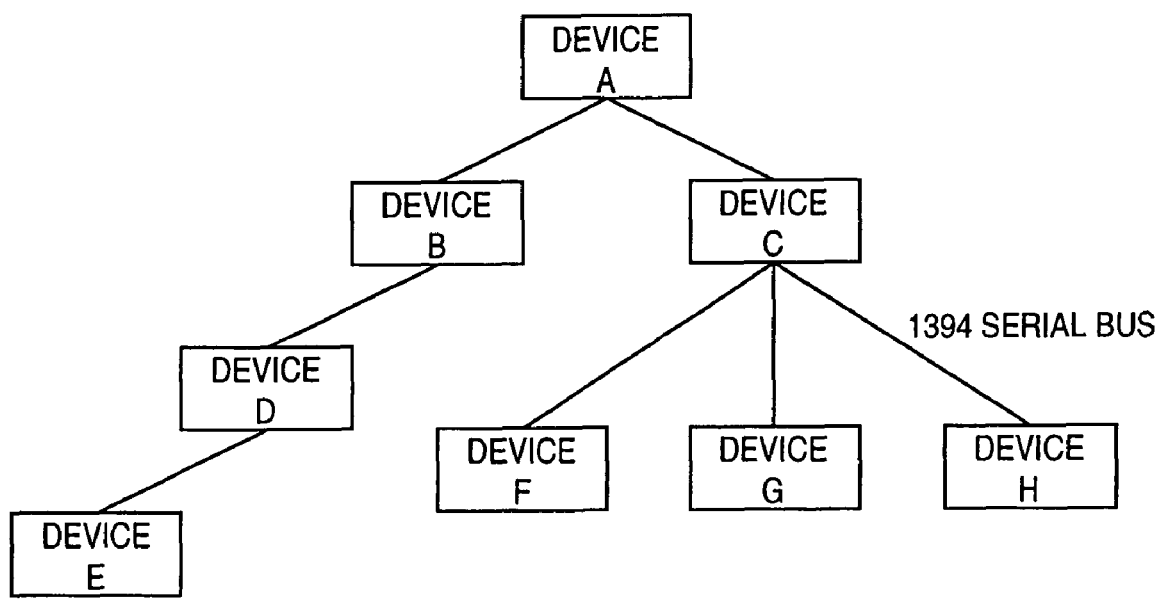
FIG. 1 is a diagram showing a networking system constructed using a 1394-compliant serial bus.

FIG. 1 illustrates an example of a networking system constructed using the 1394 serial bus. This system has devices A, B, C, D, E, F, G and H. Twisted-pair cables of the 1394 serial bus connect devices A and B; A and C; B and D; D and E; C and F; C and G; and C and H. Examples of the devices A to H are a personal computer, digital VTR, DVD, digital camera, hard disk and monitor.

The scheme for connecting these devices can be a mixture of a daisy chaining and node branching. A high degree of freedom in making the connections is possible.

Each device has its own ID and by, recognizing one another based upon their IDs, the devices construct one network over an area connected by the 1394 serial bus. By simply interconnecting adjacent devices in succession by one 1394 serial-bus cable connected between adjacent devices, each device functions as a relay and the devices in their entirety construct one network.

When the cable is connected to a device through a plug-and-play function, which is one feature of a 1394 serial bus, device recognition and recognition of the status of a connection is performed automatically.

In the system shown in FIG. 1, devices can be deleted from or added to the network. At such time bus reset is performed automatically, the network configuration that prevailed thus far is reset and then a new network is constructed a fresh. This function makes it possible to set up a network at any time and for the network to identify the devices constructing it.

Further, 100, 200 and 400 Mbps are available as the data transfer speeds. Devices having higher transfer speeds support lower transfer speeds and are compatible with the devices of lower speed.

The data transfer modes available are an asynchronous transfer mode for transferring asynchronous data such as control signals, and an isochronous transfer mode for transferring isochronous data such as real-time video and audio data. In each cycle (usually 125 µs), the asynchronous data and isochronous data are mixed and transferred in one cycle, while priority is given to transfer of the isochronous data, following transfer of a cycle-start packet (CSP) that indicates the start of the cycle.

Figure 2:
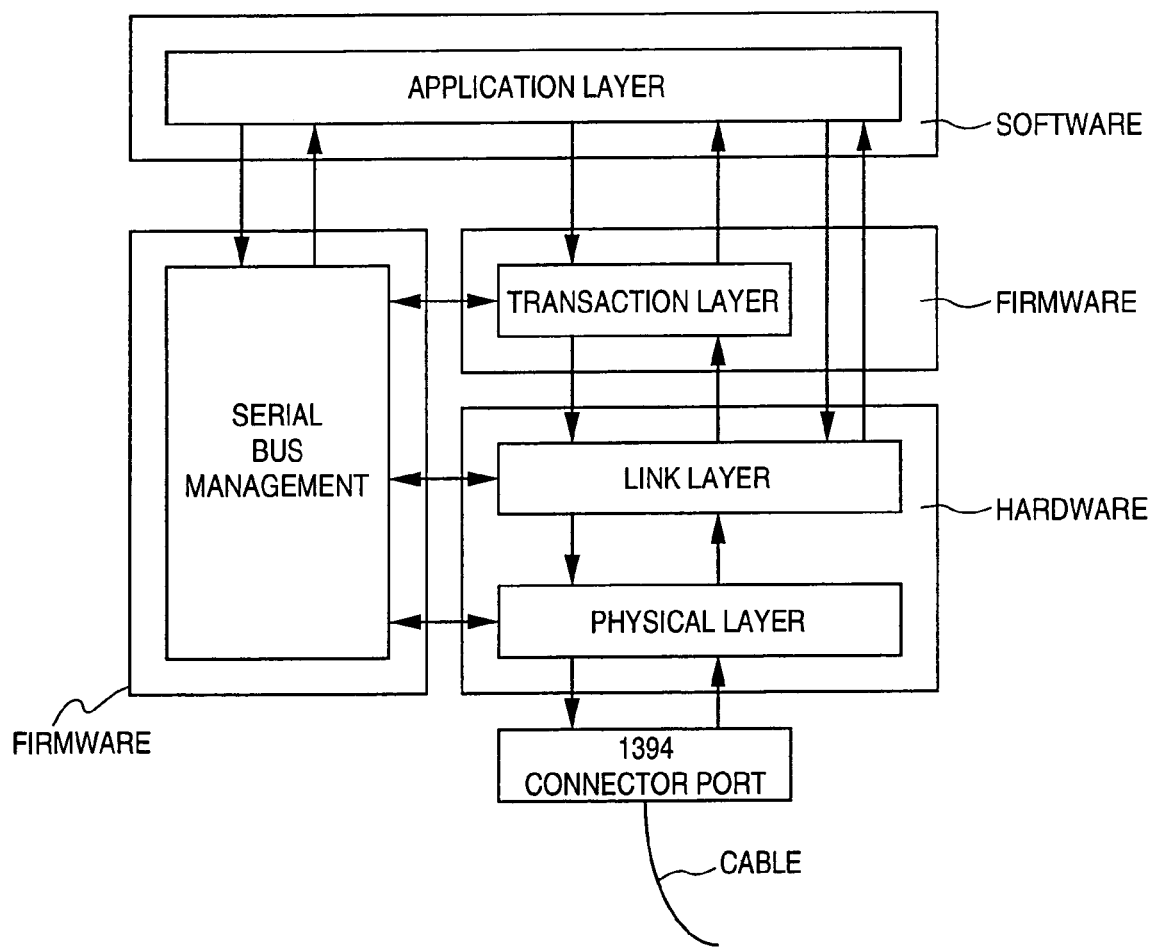
FIG. 2 is a diagram showing the structural components of the 1394-compliant serial bus.

FIG. 2 illustrates the structural components of the 1394 serial bus.

The 1394 serial bus has a layered (hierarchical) structure overall. As shown in FIG. 2, the most basic hardware component is the cable of the 1394 serial bus. The cable has a connector port to which the cable is connected. A physical layer and a link layer are the higher layers of the hardware.

In practical terms, the hardware is constituted by interface chips, of which the physical layer performs encoding and connector-related control, etc., and the link layer performs packet transfer and cycle-time control, etc.

The firmware includes a transaction layer for managing data to be transferred (transacted) and for issuing instructions such as read and write instructions. Serial-bus management is for managing the status of connections and the ID of each connected device as well as the configuration of the network.

The hardware and firmware make up the essential structure of the 1394 serial bus.

The software constitutes an application layer that differs depending upon the software used. The application layer decides how data is placed on the interface. For example, this is stipulated by a protocol such as an audio-video protocol.

The foregoing sets forth the structure of the 1394 serial bus.

Figure 3:
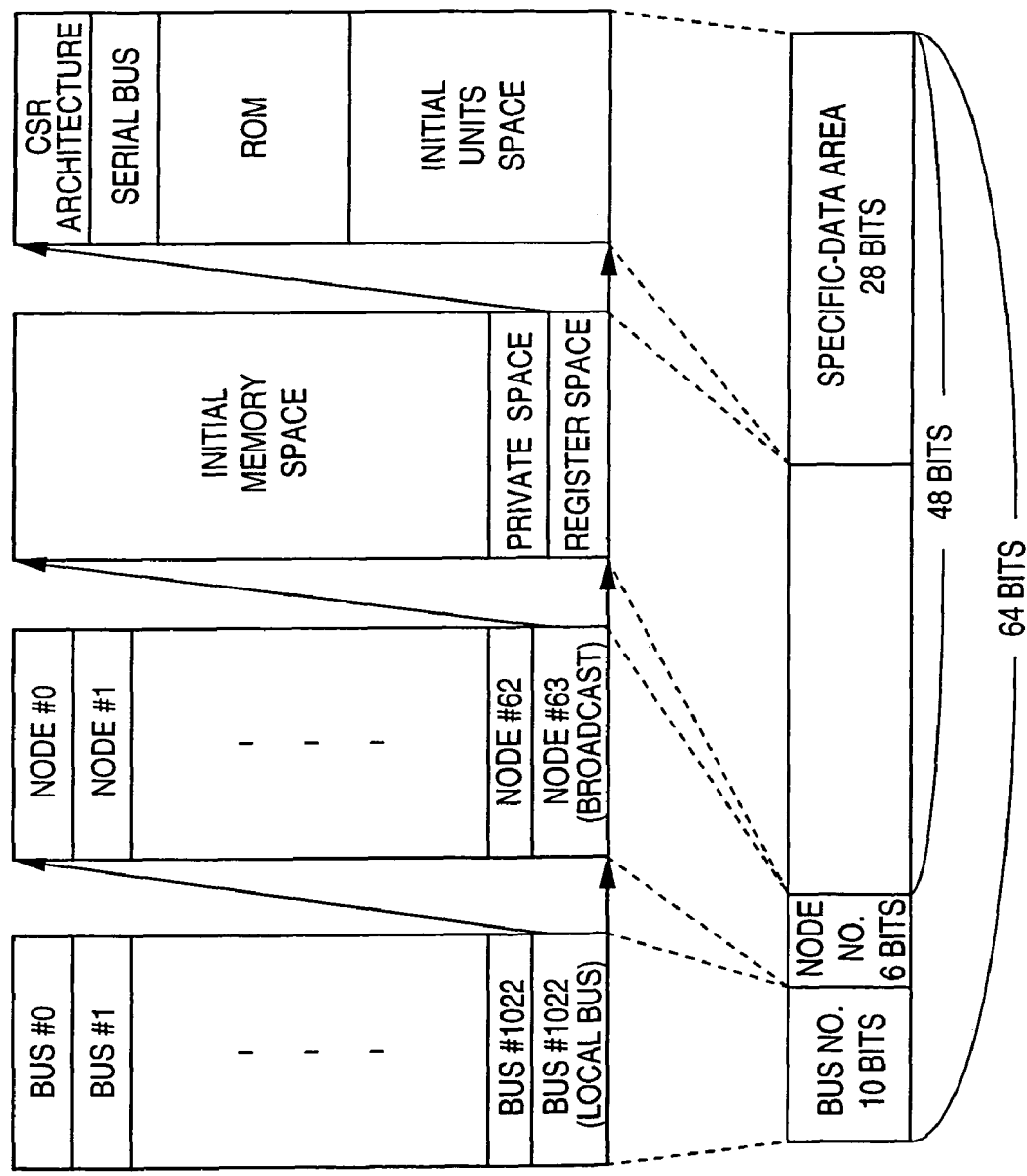
FIG. 3 is a diagram showing the address space of the 1394-compliant serial bus.

FIG. 3 illustrates the address space of the 1394 serial bus.

Each device (node) connected to the 1394 serial bus always possesses a 64-bit address that is specific to the node. Storing these addresses in a ROM makes it possible for a node's own address and for the node addresses of other nodes to be recognized at all times. This also makes it possible to perform communication in which the other party is specified.

Addressing a 1394 serial bus is performed in compliance with the standard of IEEE 1212. An address is set using the first 10 bits to specify a bus number and the next six bits to specify a node ID number. The remaining 48 bits constitute address width given to a device and can be used as the specific address space. The last 28 bits of these 48 bits serve as an area for specific data and store information for identifying each device and for designating conditions of use.

The foregoing is an overview the 1394 serial bus technology.

The features of the 1394 serial bus will now be described in greater detail.

<Electrical Specifications of the 1394 Serial Bus>

Figure 4:
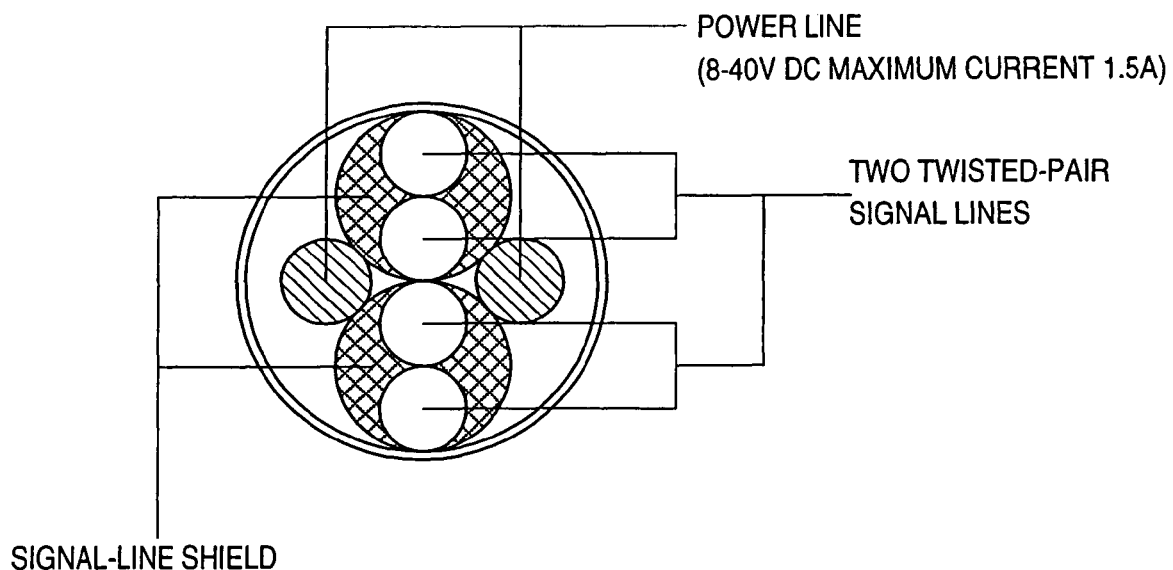
FIG. 4 is a sectional view of the cable of the 1394-compliant serial bus.

FIG. 4 is a sectional view illustrating the 1394 serial bus cable.

The connection cable of the 1394 serial bus may be internally provided with a power-supply line in addition to two twisted-pair signal conductors. This makes it possible to supply power to a device not having a power supply and to a device whose voltage has dropped due to failure. Note, there is a simplified connection cable which does not include a power-supply line. However, such a cable is used to connect to specific devices. According to specifications, the voltage of the power that flows through the power-supply line is 8 to 40 V and the current is a maximum of 1.5 A DC.

<DS-Link Coding>

Figure 5:
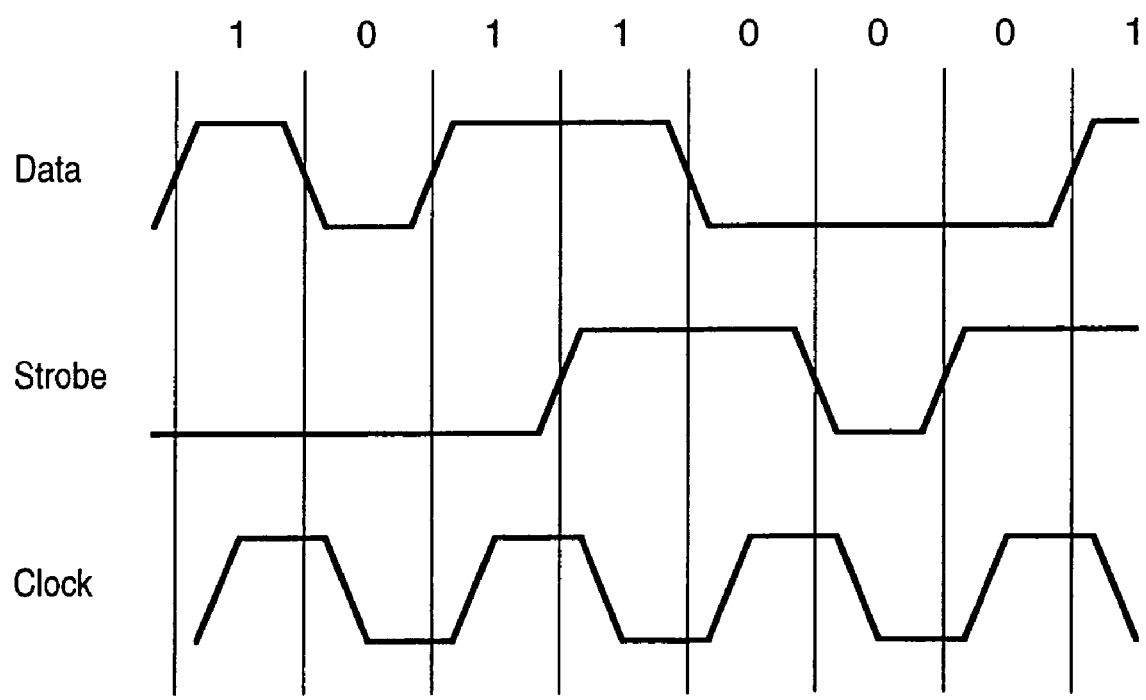
FIG. 5 is a diagram useful in describing the DS-link coding scheme of a data transfer format.

FIG. 5 is a diagram useful in describing the DS-link coding scheme of a data transfer format employed in the 1394 serial bus.

The 1394 serial bus employs DS-link (Data/Strobe link) coding. DS-link coding is suited to high-speed serial-data communication. This requires two twisted-pair signal lines. One twisted-pair mainly sends data and the other sends a strobe signal. On the receiving side, a clock can be reproduced by taking the exclusive-OR between the transmitted data and strobe.

Using the DS-link coding scheme is advantageous in that transmission efficiency is higher in comparison with other serial-data transmission schemes and in that the scale of the controller LSI circuitry can be reduced because a PLL circuit is unnecessary. Furthermore, when there is no data to be transferred, there is no need to send information indicative of the idle state. Accordingly, by placing the transceiver circuit of each device in the sleep state, less power is consumed.

<Bus-Reset Sequence>

In the 1394 serial bus, a node ID is assigned to each connected device (node) so that the devices may be recognized as constituting a network.

If there is a change in the network configuration, e.g., a change caused by increasing or decreasing the number of nodes by plugging in or unplugging a node or by turning a node power supply on or off, recognition of the new network configuration becomes necessary. At such time each node that has sensed the change transmits a bus-reset signal over the bus and a mode in which the new network configuration recognized is established. The method of sensing the change involves sensing a change in bias voltage on the board of the 1394 port.

Upon being sent a bus-reset signal from a certain node, the physical layer of each node receives the bus-reset signal and, at the same time, reports occurrence of the bus reset to the link layer and sends the bus-reset signal to the other nodes. After all nodes have eventually sensed the bus-reset signal, bus reset is activated.

Bus reset can also be activated by hardware detection of cable plugging/unplugging and of network anomalies and by issuing an instruction directly to the physical layer by host control from the protocol. When bus reset is activated, data transfer is suspended temporarily and is resumed on the basis of the new network configuration after the completion of reset.

The foregoing is a description of the bus-reset sequence.

<Node-ID Decision Sequence>

In order for each of the nodes to construct the new network configuration after bus reset, an operation for assigning an ID to each node begins. The usual sequence from bus reset to determination of node IDs will be described with reference to the flowcharts of FIGS. 6, 7 and 8.

Figure 6:
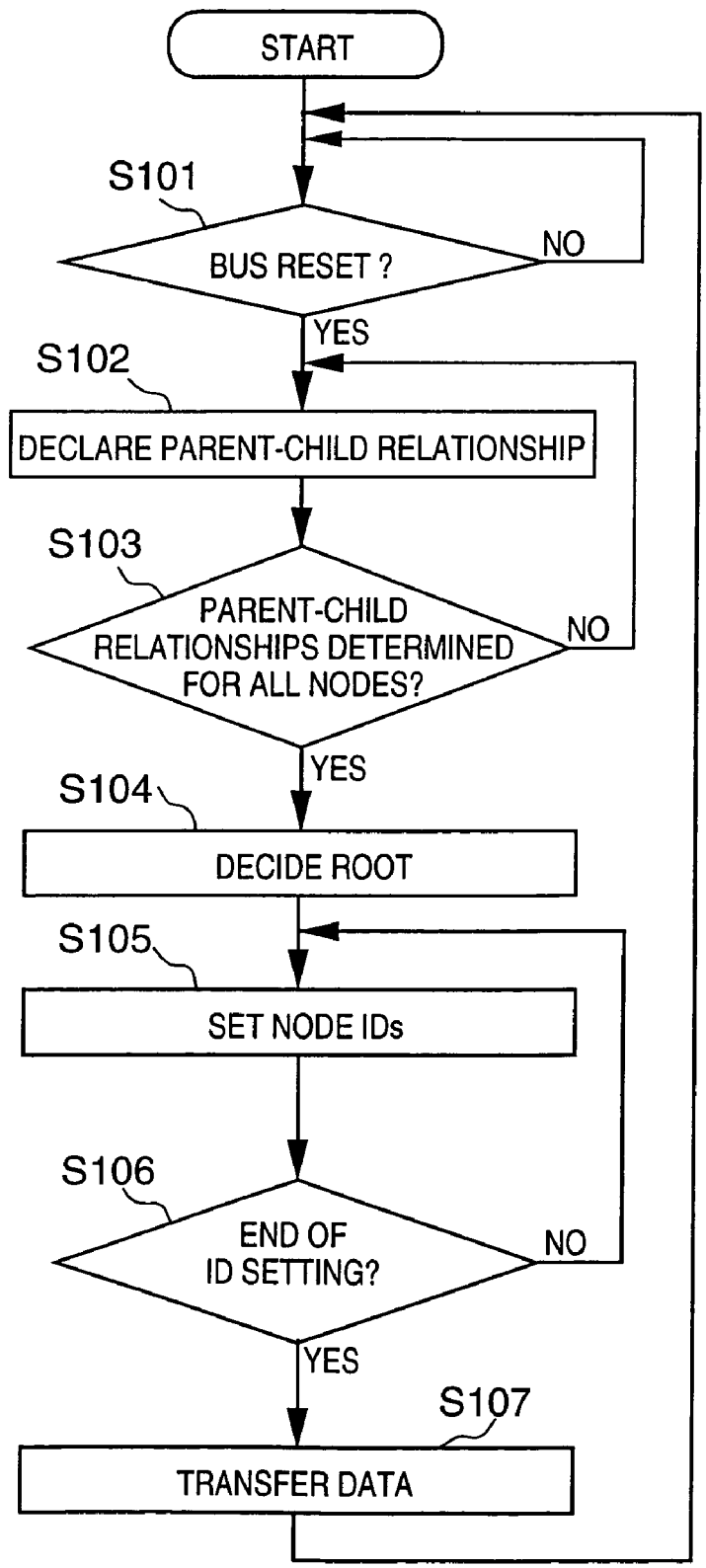
FIG. 6 is a flowchart illustrating a general sequence from bus reset to determination of a node ID.

The flowchart of FIG. 6 illustrates a series of bus operations from occurrence of bus reset to determination of node IDs and data transfer.

First, occurrence of bus reset within the network is monitored constantly at step S101. Control proceeds to step S102 when bus reset occurs as a result of a node power supply being turned on or off, etc.

A declaration of parent-child relationship is made between directly connected nodes in order to ascertain the status of the connections of the new network from reset state of the network. If the parent-child relationships have been determined between all nodes at step S103, one root is decided at step S104. Until the parent-child relationships are determined between all nodes, the declaration of the parent-child relationship at step S102 is repeated and a root is not decided.

When a root is decided at step S104, a node-ID setting operation for providing each node with an ID is carried out at step S105. Node IDs are set in a predetermined node sequence and the setting operation is performed repeatedly until all nodes have been provided with IDs. When the setting of IDs for all nodes is eventually completed at step S106, the new network configuration will have been recognized at all nodes and a state will be attained in which data transfer between nodes can be carried out at step S107. Data transfer thus begins.

When the state of step S107 is attained, a transition is again made to the mode in which the occurrence of bus reset is monitored. If bus reset occurs, the setting operation from step S101 to step S106 is repeated.

Figure 7:
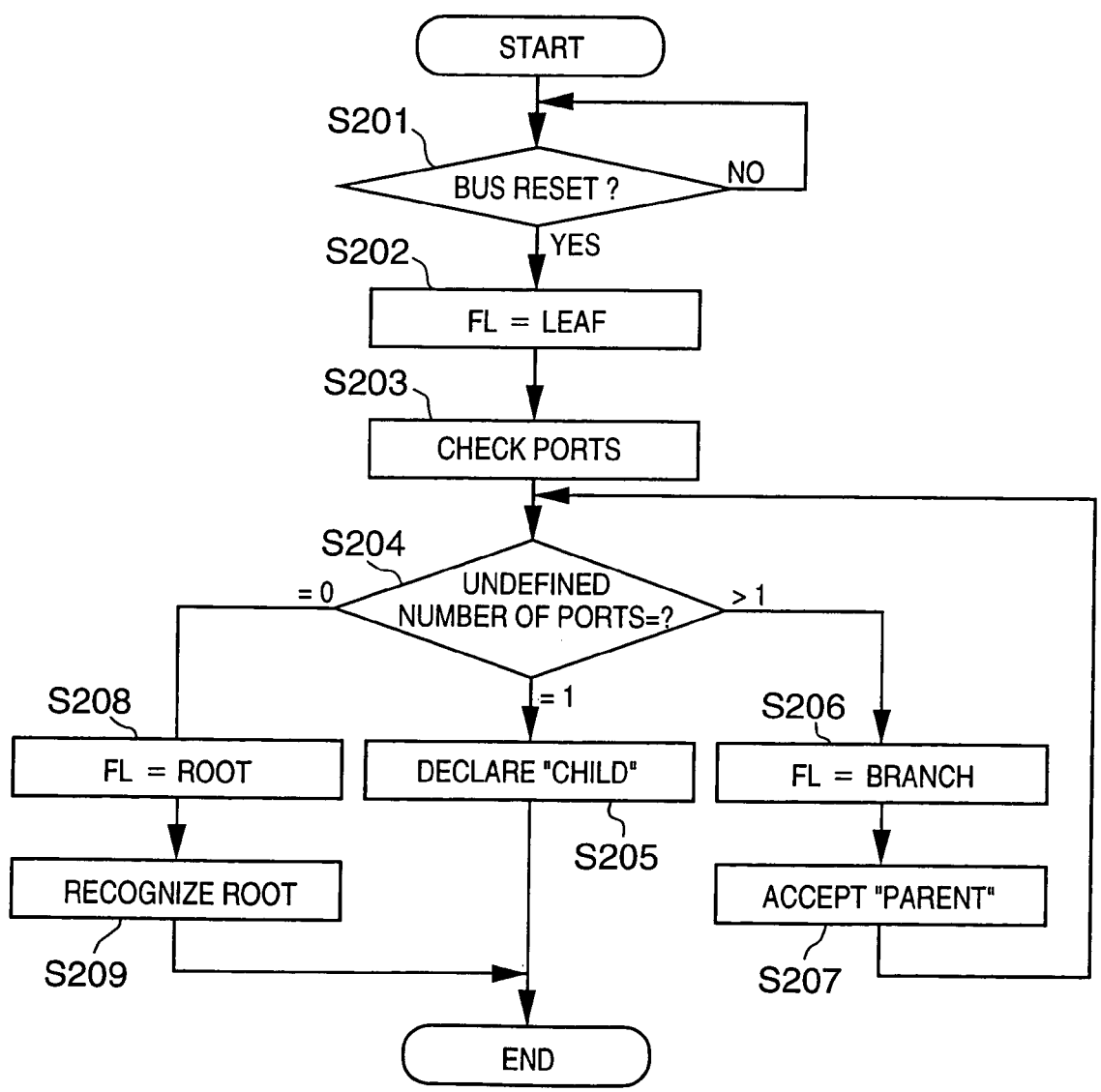
FIG. 7 is a flowchart illustrating a general sequence from bus reset to determination of a node ID.
Figure 8:
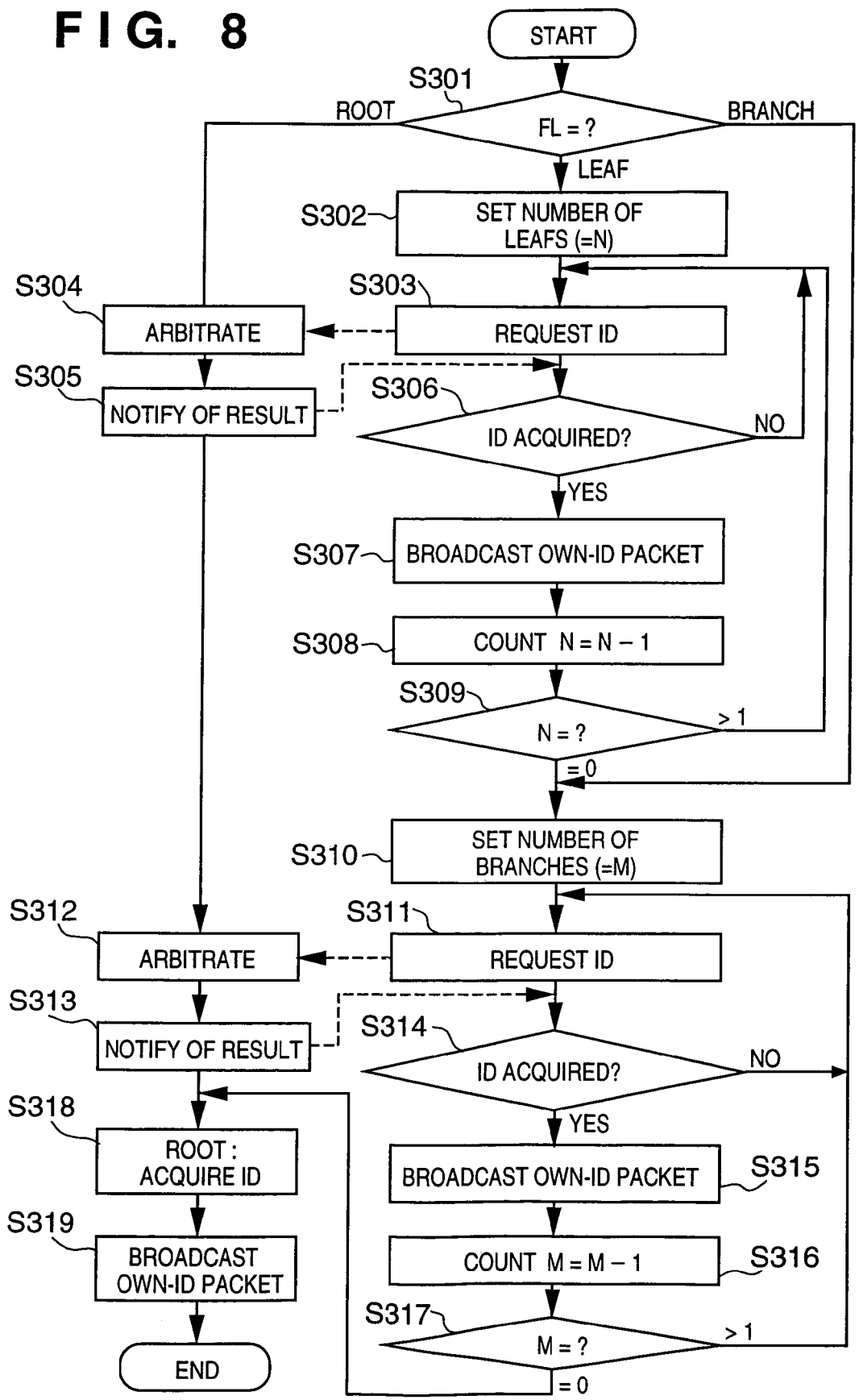
FIG. 8 is a flowchart illustrating a general sequence from bus reset to determination of a node ID.

The foregoing is a description of the flowchart of FIG. 6. The portion of this flowchart from bus reset to root determination and the procedure from the conclusion of root determination to the end of ID setting are illustrated in FIGS. 7 and 8, respectively, when expressed more precisely in flowchart form.

The flowchart of FIG. 7 will now be described.

When a bus reset occurs at step S201, the network configuration is reset temporarily. It should be noted that occurrence of bus reset is constantly monitored at step S201. Next, at step S202, a flag indicative of a leaf node is set for each device as the first step of an operation for re-recognition of the topology of the reset network. Furthermore, at step S203, each device determines how many of its own ports have been connected to other devices.

This is followed by step S204, at which the number of undefined ports (ports for which the parent-child relationship has not been determined) is checked, based upon the number of ports obtained at step S203, in order to begin the ensuing declaration of parent-child relationship. After bus reset, the number of ports will be equal to the number of undefined ports. However, as parent-child relationships are decided, the number of undefined ports sensed at step S204 changes.

Immediately after bus reset, nodes which can make declarations of parent-child relationship first are limited to leafs. A node can ascertain that it is a leaf from examining the number of connected ports at step S203. The leaf declares with respect to a node connected to it that "This node is the child and the other node is the parent" at step S205. This operation then ends.

With regard to a node whose number of connected ports is found to be plural at step S203, meaning that the node has been identified as a branch point, the number of undefined ports after bus reset is found to be greater than 1 at step S204. As a result, control proceeds to step S206. First a flag indicative of a branch is set at step S206. This is followed by step S207, at which the node waits for acceptance of "Parent" in the declaration of the parent-child relationship from a leaf. The leaf makes the declaration of the parent-child relationship and the branch that received this at step S207 checks the number of undefined ports at step S204. If the number of undefined ports is 1, it is possible to declare "The node is a child" at step S205 to the node connected to the remaining port. If, from the second time onward, there are two or more branches when the number of undefined ports is checked at step S204, the node again waits in order to accept "Parent" from a leaf or from another branch at step S207.

Finally, when any one branch or, in exceptional cases, a leaf (because the node did not operate quickly enough to issue the "Child" declaration) indicates zero as the number of undefined ports at step S204, the declarations of the parent-child relationship for the entire network end as a result. The sole node for which the number of undefined ports has become zero (i.e., for which all of the ports have been determined to be parent ports) has a root flag set for it at step S208, and this node is recognized as a root at step S209.

Thus ends the processing of FIG. 7 from bus reset to declaration of the parent-child relationships between all nodes of the network.

The flowchart of FIG. 8 will now be described.

In the sequence up to FIG. 7, information on the flags of all nodes that indicates whether a node is a leaf, a branch or a root is set. The nodes are classified on the basis of this information at step S301. In the operation of assigning an ID to each node, the node for which an ID can be set first is a leaf. The setting of IDs is performed in the order leaf→branch→root starting from smaller numbers (from a node number 0).

The number N (where N is a natural number) of leafs that exist in the network is set at step S302. Each leaf then requests the root to be given an ID at step S303. In a case where there are a plurality of requests, the root performs arbitration (an operation to decide on any one node) at step S304. An ID number is assigned to the one winning node and the losing nodes are so notified at step S305.

A leaf whose acquisition of an ID ended in failure at step S306 issues an ID request again. The foregoing operation is then repeated. A leaf that has acquired an ID transfers the ID information of this node to all nodes by a broadcast at step S307.

When the broadcast of the ID information of one node ends, the number of remaining leafs is reduced by one at step S308. If the number of remaining leafs is found to be one or more at step S309, operation is repeated from the ID request at step S303. When all leafs have finally broadcast ID information, N becomes equal to 0 at step S309 and control then proceeds to the setting of branch IDs.

The setting of branch IDs is performed in a manner similar to that for leafs. That is, the number M (where M is a natural number) of branches that exist in the network is set at step S310. Each branch then requests the root to be given an ID at step S311. In response, the root performs arbitration at step S312 and assigns the winning branch a number in order starting from smaller numbers that follow those already assigned to leafs. The root notifies a branch that has issued a request of its ID number or of the fact that the request failed at step S313. A branch whose acquisition of an ID ended in failure at step S314 issues an ID request again. The foregoing operation is then repeated.

A branch that has acquired an ID transfers the ID information of this node to all nodes by a broadcast at step S315.

When the broadcast of the ID information of one node ends, the number of remaining branches is reduced by one at step S316. If the number of remaining branches is found to be one or more at step S317, operation is repeated from the ID request at step S311. This operation is carried out until all branches eventually broadcast ID information. When all branches acquire node IDs, M becomes equal to 0 at step S317 and the mode for acquiring branch IDs ends.

When processing thus far ends, a node which has not yet acquired ID information is a root only. The root sets the largest unassigned number as its own ID number at step S318 and broadcasts the root ID information at step S319.

Thus, as shown in FIG. 8, the procedure up to the setting of IDs for all nodes following the parent-child relationship determinations ends.

Next, operation in an actual network shown in FIG. 9 will be described as one example.

Figure 9:
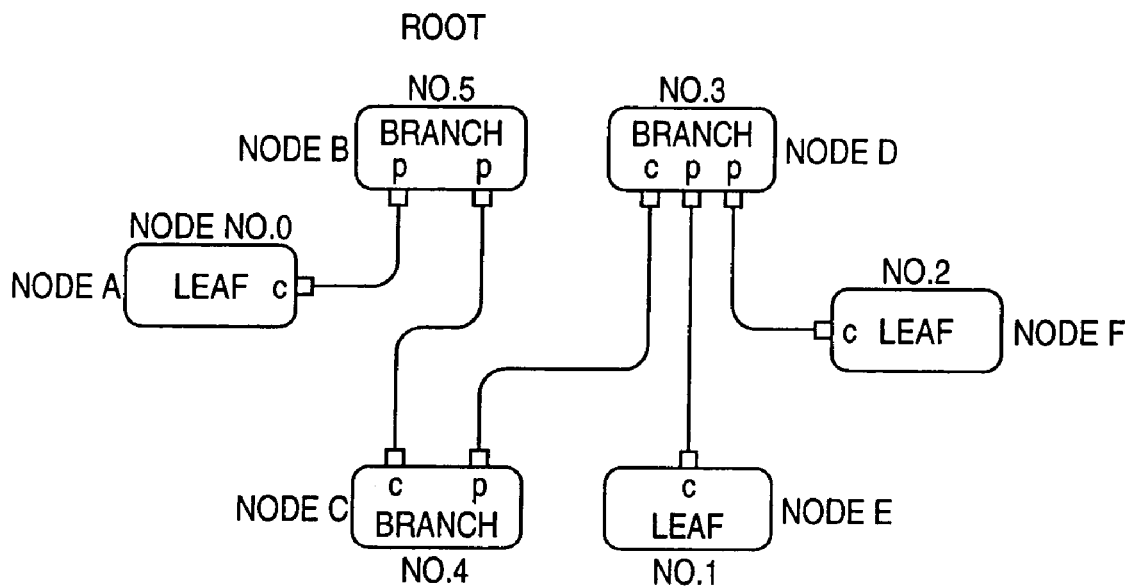
FIG. 9 is a diagram useful in describing a node-ID determination sequence.

The hierarchical structure described in FIG. 9 is such that nodes A and C are directly connected as inferior to node B (the root), node D is directly connected as inferior to node C, and nodes E and F are directly connected as inferior to node D. This hierarchical structure and a procedure for determining the route node and node IDs will be described below.

In order to recognize the connection status of each node after bus reset, a declaration of the parent-child relationship is made between the ports at which the nodes are directly connected. A parent has a superior status in the hierarchical structure and the child has an inferior status. In FIG. 9, the node that issues the declaration on parent-child relationship first following bus reset is the node A. Basically, declaration of the parent-child relationship can be issued from a node (referred to as a leaf) having a connection at only one port. The node can ascertain this from the fact that is has only one port connected. In this way the node recognizes that it is at a terminus of the network and the parent-child relationships are determined one after another starting from those terminus nodes that go into operation earliest.

Thus, the port on the side (node A of the nodes A and B) that has issued the declaration of the parent-child relationship is set as a child port, and the port on the side of the other party (node B) is set as a parent port. Accordingly, it is determined that nodes A and B are child-parent related, nodes E and D are child-parent related, and nodes F and D are child-parent related, respectively.

Nodes one layer higher have a plurality of connected ports. These nodes are referred to as branches. Among these nodes, those that have received declarations of the parent-child relationship from other nodes issue declarations of the parent-child relationship in succession and to their superiors. In FIG. 9, after node D is determined to be the parent in the D-E and D-F relationships, it issues the declaration of the parent-child relationship with respect to node C. As a result, the relationship determined between nodes D and C is child-parent, respectively.

Node C, which has received the declaration of parent-child relationship from node D, issues a declaration of parent-child relationship with regard to node B, which is connected to the other port of node C. As a result, it is determined that the relationship between nodes C and B is child-parent, respectively.

Thus, the hierarchical structure of FIG. 9 is constructed and node B, which is the parent to all connected nodes, is eventually determined to be the root node. Only one root node can exist in one network configuration.

Node B in FIG. 9 has been determined to be the root node. If node B, which has received the declaration of parent-child relationship from node A, issues its declaration of parent-child relationship to other nodes at an early timing, there is the possibility that the root node will shift to another node. In other words, depending upon the timing at which the declaration is transmitted, any node can become the root node, and in one and the same network configuration, the root node is not always fixed.

After the root node is decided, a transition is made to a mode for deciding the node IDs. In this mode all nodes communicate their own node IDs to all other nodes. This is a broadcast function.

A node's own ID information includes its own node number, information on the position at which it has been connected, the number of ports it possesses, the number of ports connected or information on the parent-child relationship of each port.

The procedure for assigning node ID numbers can be started from nodes (leafs) having only one of their ports connected. Node numbers 0, 1, 2, . . . are assigned to these nodes in regular order.

A node that has acquired a node ID broadcasts information inclusive of the node number to each of the other nodes. As a result, this ID number is recognized as being "already assigned".

If all leafs have finished acquiring their own node IDs, then operation shifts to branches so that node ID numbers are assigned to branch nodes after leaf nodes. In a manner similar to that of the leafs, branches to which node ID numbers have been assigned broadcast their node ID information in succession. Finally, the root node broadcasts its own ID information. That is, the root always possesses the largest node ID number.

Thus, the assignment of the node IDs of the entire hierarchical structure ends, the network is reconstructed and the bus initialization operation is completed.

<Arbitration>

With a 1394 serial bus, arbitration for bus access is always carried out before data transfer. The 1394 serial bus is a logical bus-type network. In other words, each separately connected device relays a transferred signal, thereby transmitting the same signal to all devices in the network. Consequently, arbitration is necessary to prevent collision of packets. As a result, only one node can perform a transfer at a certain time.

Figure 10A:
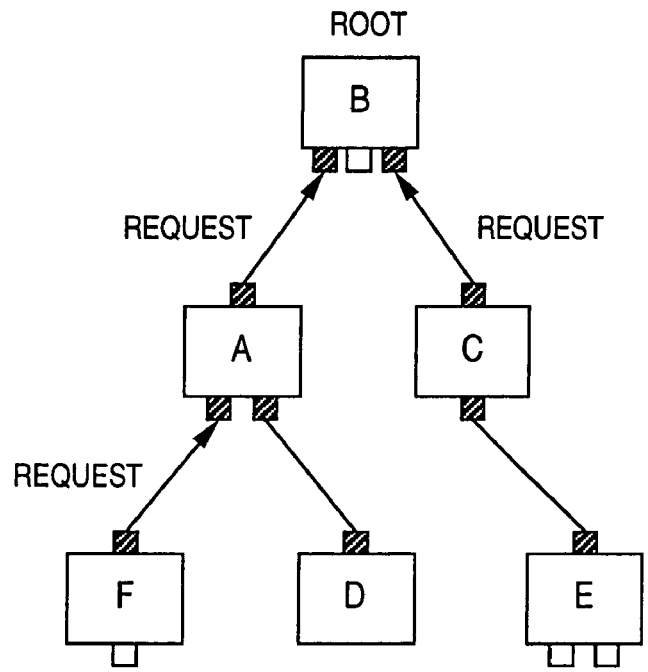
FIGS. 10A and 10B are diagrams useful in describing arbitration.
Figure 10B:
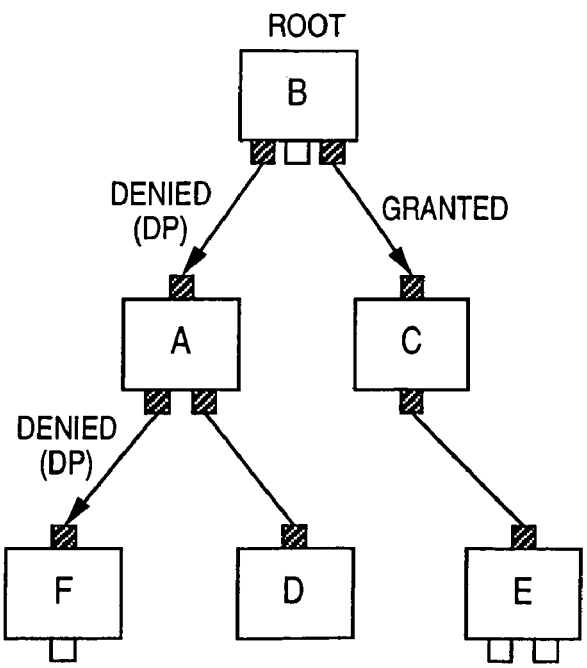

FIGS. 10A and 10B are diagrams useful in describing arbitration, in which FIG. 10A illustrates the situation when bus access bus is requested and FIG. 10B shows a situation in which bus access is allowed or refused in response to a request. Arbitration will now be described with reference to these diagrams.

When arbitration starts, one or a plurality of nodes each sends the parent node a request for bus access privilege. In FIG. 10A, nodes C and F are the nodes issuing bus access requests. A parent node (node A in FIG. J) that has received a bus access request sends (relays) the request to its parent node. This request eventually arrives at the root that performs arbitration.

Upon receiving the bus access request, the root node decides which node should be granted access to the bus. Such arbitration is performed solely by the root node. The node that has won the arbitration is granted access to the bus. FIG. 10B shows that bus access has been granted to node C and denied to node F.

A DP (Data Prefix) is sent to the node that lost the arbitration, thereby informing this node of refusal. The bus access request from the refused node waits for the next arbitration.

The node that won the arbitration and was granted bus access can start transferring data.

Figure 11:
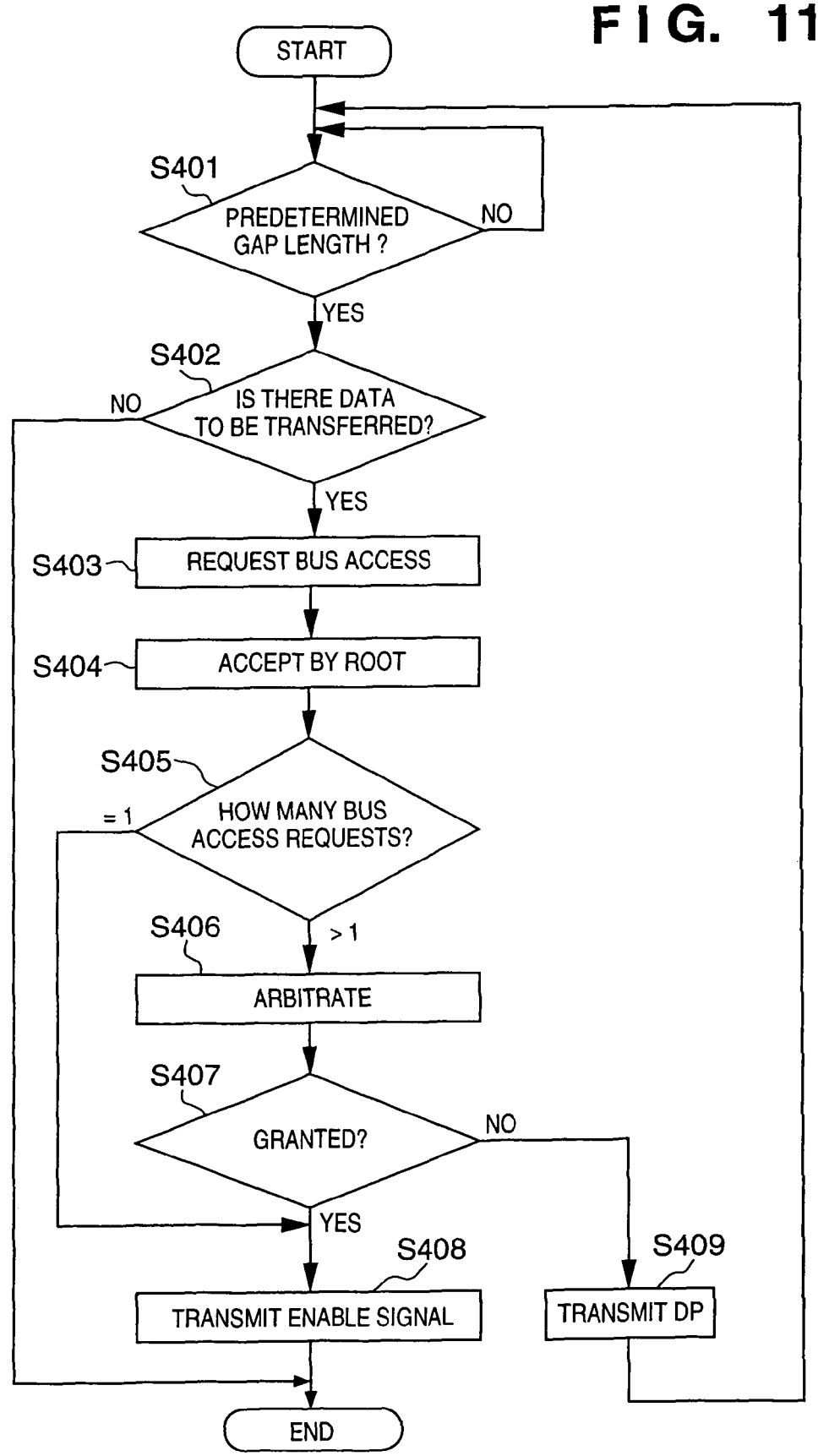
FIG. 11 is a flowchart useful in describing arbitration.

The flow of arbitration will be described with reference to the flowchart of FIG. 11.

In order for a node to start data transfer, it is necessary that the bus be in an idle state. In order to recognize that the bus is currently idle following the end of a data transfer performed previously, each node judges that its own transfer can start based upon elapse of a predetermined idle-time gap length (e.g., a subaction gap) set separately in each transfer mode.

First, at step S401, it is determined whether the predetermined gap length has been obtained. The gap length conforms to the data to be transferred, which is asynchronous data or isochronous data. As long as the predetermined gap length is not obtained, bus access needed to begin a transfer cannot be requested. Accordingly, the node waits until the predetermined gap length is obtained.

If the predetermined gap length is obtained at step S401, it is determined at step S402 whether there is data to be transferred. If there is such data, then, at step S403, the root is sent a bus access request so as to reserve the bus for the transfer. The signal representing the bus access request eventually arrives at the root while being relayed through each device in the network, as shown in FIG. J. If it is found at step S402 that there is no data to be transferred, the node stands by.

Next, if the root receives one or more bus access requests from step S403 at step S404, then, at step S405, the root checks the number of nodes that issued access requests. If it is found at step S405 that the number of nodes is equal to 1 (i.e., that one node issued a bus access request), then this node is provided with the bus access that will be allowed next. If it is found at step S405 that the number of nodes is greater than 1 (i.e., that a plurality of nodes issued bus access requests), then the root performs arbitration at step S406 to decide one node that is to be granted bus access. This arbitration operation assures that all devices have fair access to the bus and does not grant access only to the same node every time.

This is followed by step S407, at which the one node granted bus access by arbitration performed at step S406 by the root and the other nodes that lost the arbitration are separated from the plurality of nodes that issued the bus access requests. Next, at step S408, the root sends an enable signal to the one node that was granted bus access by arbitration or to a node that obtained bus access without arbitration because it was found at step S405 that the number of nodes requesting access is equal to one. The node that has obtained the enable signal immediately starts transferring data (a packet) that is to be transferred.

A node that lost the arbitration at step S406 and was not granted bus access is sent the DP (Data Prefix) packet, which is indicative of failed arbitration, by the root at step S409. Upon receiving this packet, the node issues the bus access request again in order to perform a transfer. As a result, control returns to step S401 and the node stands by until the predetermined gap length is obtained.

<Asynchronous Transfer>

Figure 12:
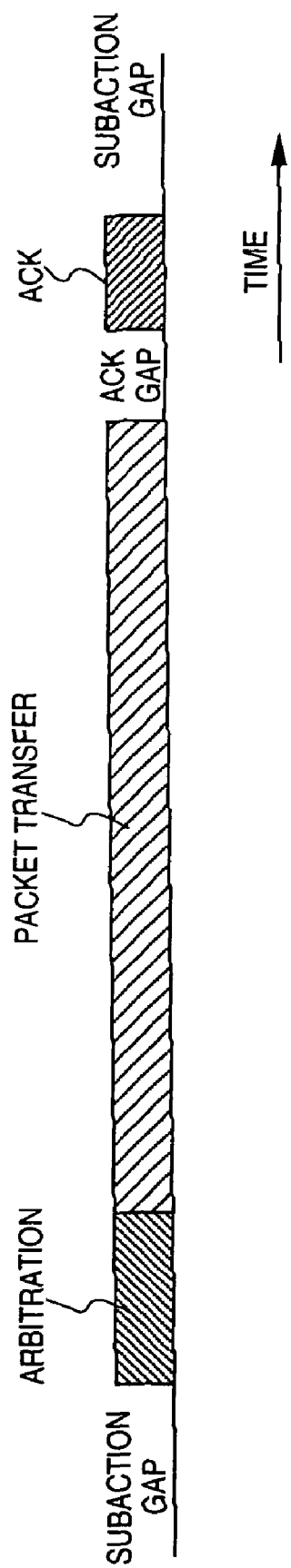
FIG. 12 is a diagram useful in describing asynchronous transfer.

Asynchronous transfer is transfer that is not synchronous. FIG. 12 illustrates the state of temporal transition in asynchronous transfer. An initial subaction gap in FIG. 12 indicates the idle state of the bus. At the moment idle time attains a fixed value, a node wishing to perform a transfer judges that the bus can be used and executes arbitration for bus acquisition.

When bus access is granted by arbitration, transfer of data is executed in a packet format. After data is transferred, a node that has received the data responds by sending back acknowledgment "ack" (a code sent back to acknowledge reception) regarding the transferred data, or by sending a response packet, after a short gap referred to as an "ack gap". Here "ack" comprises 4-bit information and a 4-bit checksum. Further, "ack" includes information such as success, busy state and pending state, etc., and is sent back immediately to the node that was the source of the transmission.

Figure 13:
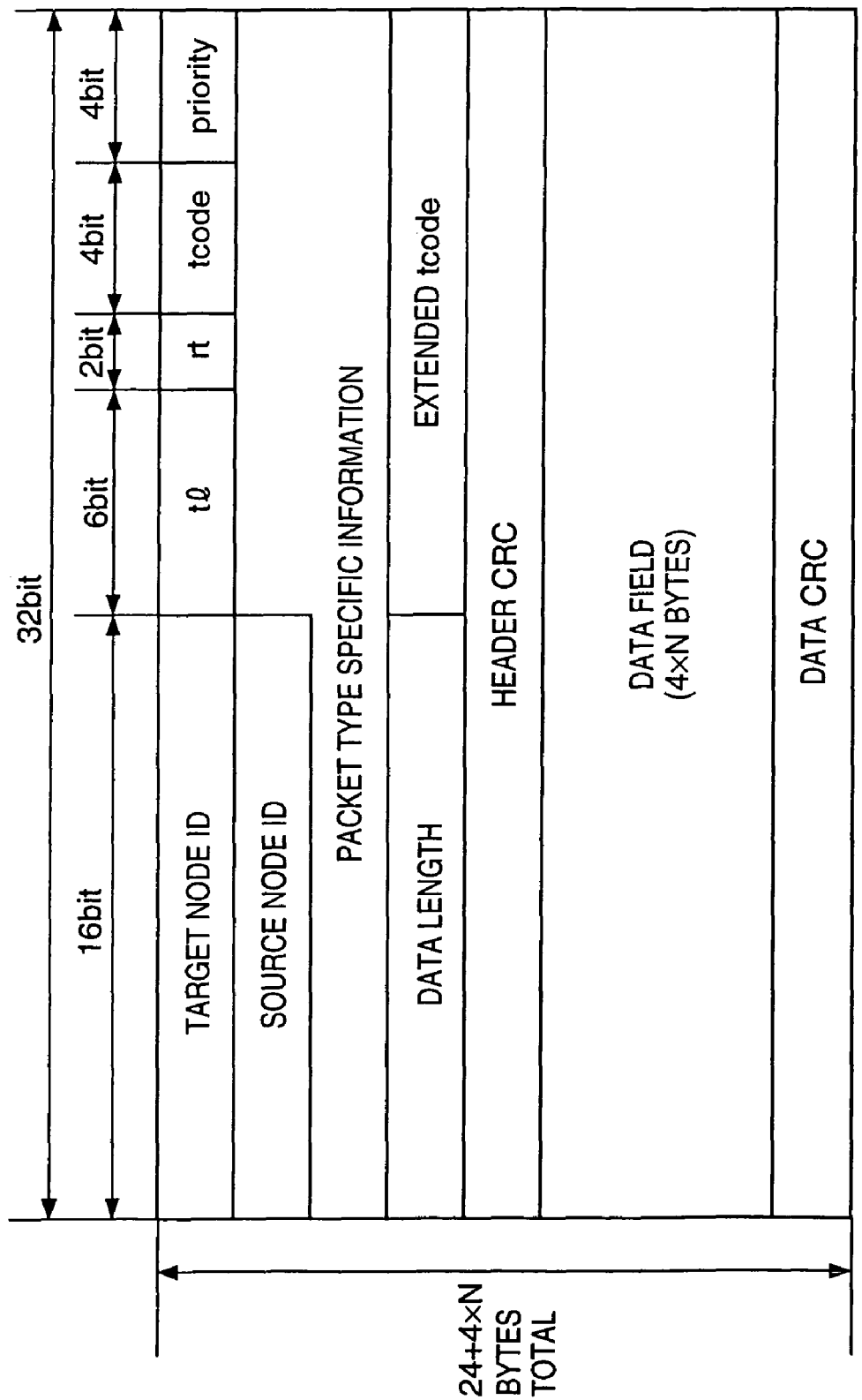
FIG. 13 is a diagram showing an example of packet format in asynchronous transfer.

FIG. 13 illustrates an example of the packet format for asynchronous transfer.

A packet has a header portion in addition to a data field and data CRC that is for error correction. As shown in FIG. 13, a target node ID, a source node ID, transfer data length and various codes are written in the header in order to be transferred.

Asynchronous transfer is one-to-one communication from one node to another. A packet that has been transferred from a node that was the source of the transfer is delivered to each node in the network. However, since addresses other than a node's own address are ignored, only the one node at the destination is read in.

<Isochronous Transfer>

Isochronous transfer is transfer that is synchronous. Isochronous transfer, which can be said to be the most significant feature of the 1394 serial bus, is a transfer mode suited to the transfer of data that requires real-time transfer, such as multimedia data composed of video data and audio data.

Whereas asynchronous transfer is one-to-one transfer, isochronous transfer is a transfer from one node that is the source of the transfer to all other nodes by means of a broadcast function.

Figure 14:
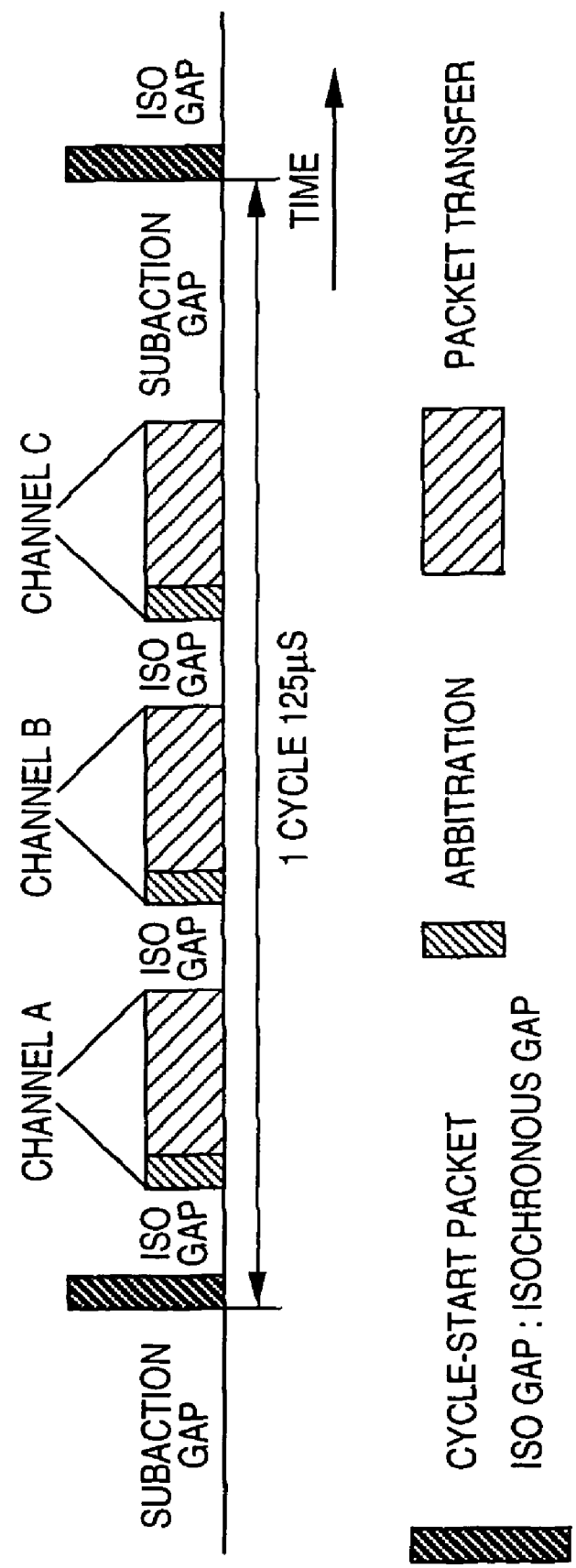
FIG. 14 is a diagram useful in describing isochronous transfer.

FIG. 14 illustrates the state of temporal transition in isochronous transfer.

Isochronous transfer is executed over a bus at fixed times. The time interval is referred to as an "isochronous cycle", the duration of which is 125 μs. The role of a cycle-start packet is to indicate the starting time of each cycle and to perform a time adjustment for each node.

A node referred to as the "cycle master" transmits the cycle-start packet. The cycle master transmits the cycle-start packet, which informs of the start of the present cycle, upon elapse of a predetermined idle time (the subaction gap) following the end of transfer in the immediately preceding cycle. The time interval in which the cycle-start packet is transmitted is 125 μs.

In FIG. 14, a plurality of various packets can be transferred in one cycle upon being distinguished from one another by assigning channel IDs to them in the manner of channel A, channel B and channel C, as illustrated. This makes it possible to perform real-time transfer among a plurality of nodes simultaneously. In addition, a receiving node reads in only the data of the ID channel which it itself desires. The channel ID does not represent the address of the transmission destination but merely provides a physical number in regard to data. Accordingly, in transmission of a certain packet, transfer is performed by broadcast in such a manner that the packet is delivered from the one transmission-source node to all of the other nodes.

As in the manner of asynchronous transfer, arbitration is carried out before transmission of a packet in isochronous transfer. However, since this is not one-to-one communication as in asynchronous transfer, "ack" (the code sent back to acknowledge reception) does not exist in isochronous transfer.

Further, the "iso gaps" (isochronous gaps) shown in FIG. 14 represent idle intervals necessary to verify that the bus is idle before an isochronous transfer is performed. When the predetermined idle time elapses, the node wishing to perform the isochronous transfer judges that the bus is idle. As a result, arbitration in advance of transfer can be executed.

Figure 15:
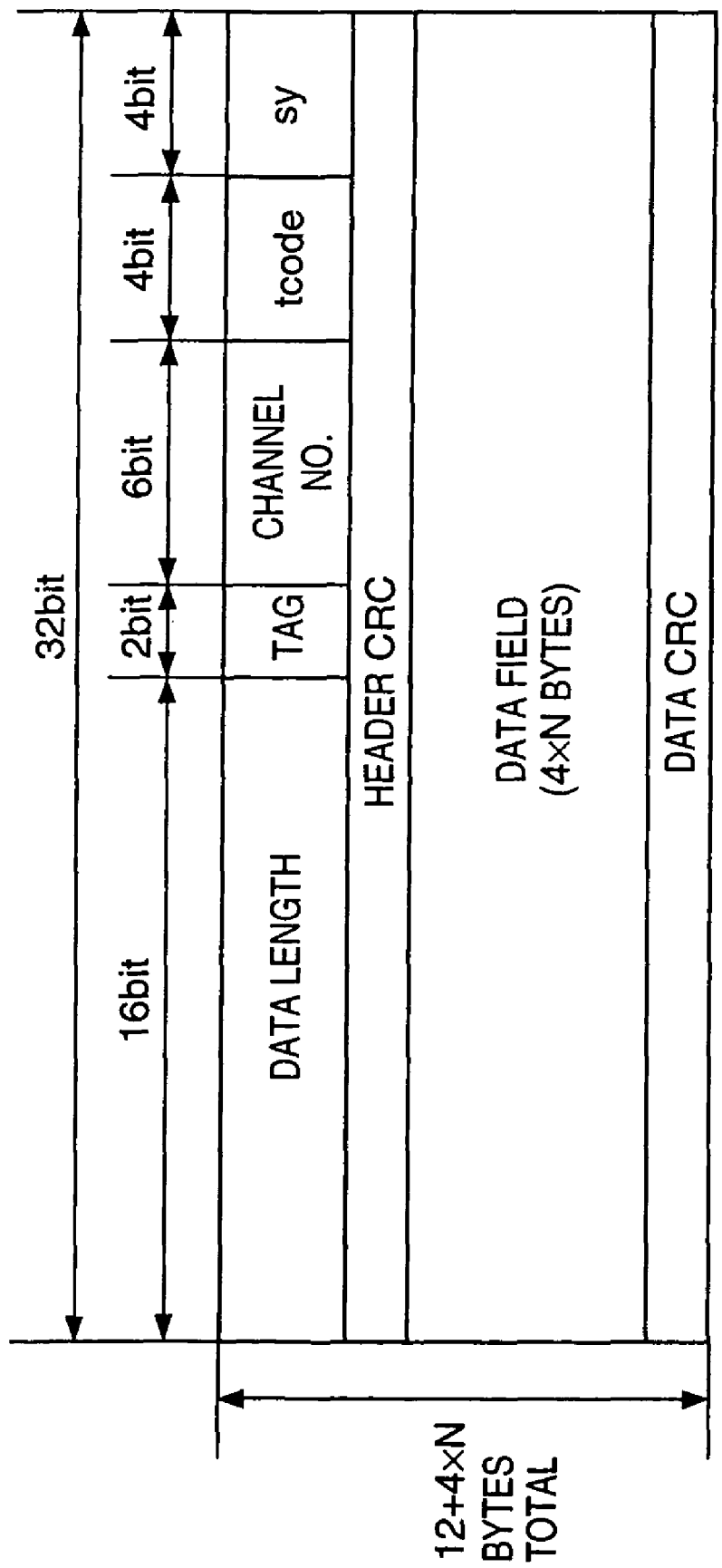
FIG. 15 is a diagram showing an example of packet format in isochronous transfer.

FIG. 15 illustrates an example of the packet format for isochronous transfer.

Each of the various packets classified by their channels has a header portion in addition to a data field and data CRC that is for error correction. As shown in FIG. 15, transfer data length, channel number, various codes and an error correction header CRC are written in the header in order to be transferred.

<Bus Cycle>

Figure 16:
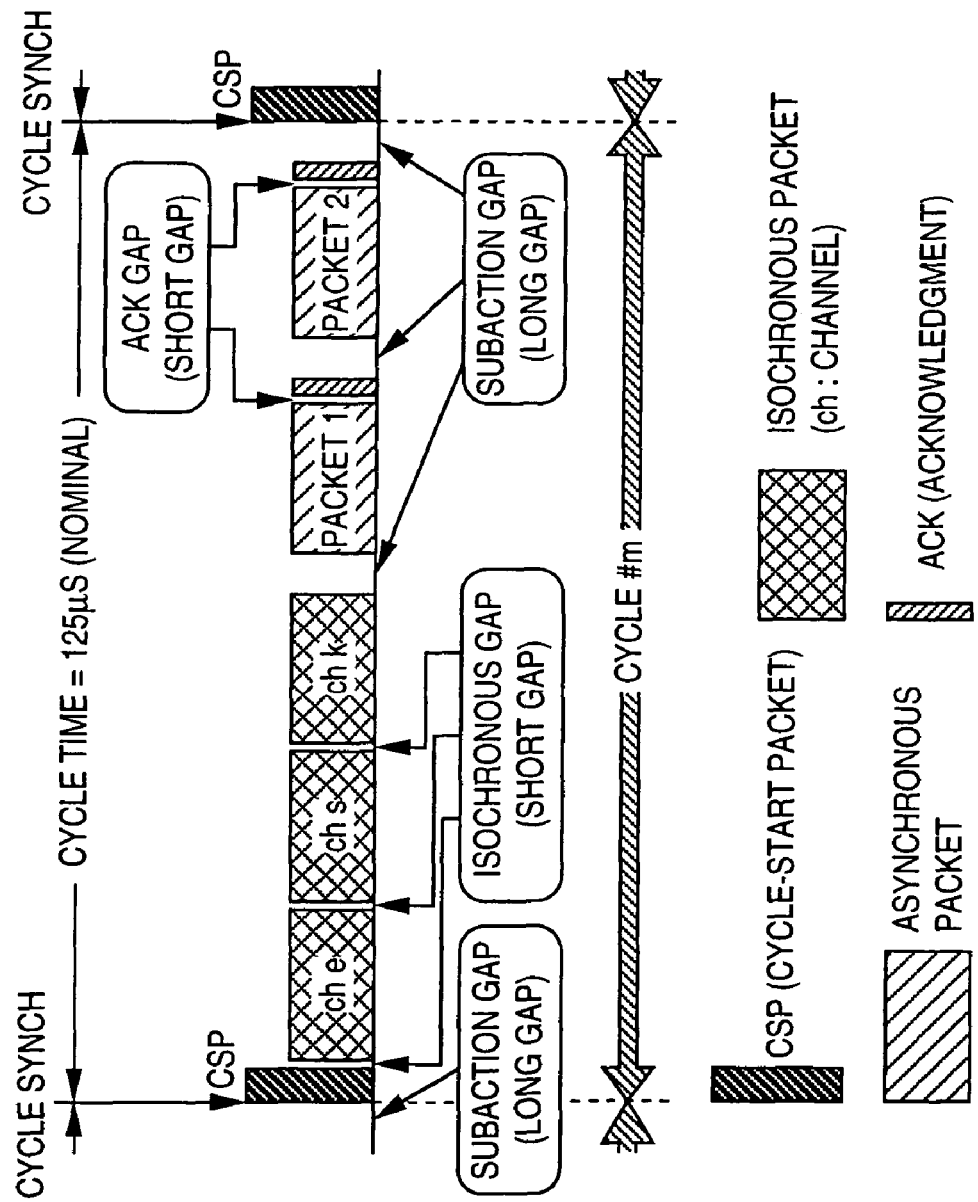
FIG. 16 is a diagram useful in describing a case where isochronous transfer and asynchronous transfer are mixed.

Transfer over an actual 1394 serial bus can be a mixture of isochronous transfer and asynchronous transfer. FIG. 16 illustrates the temporal transition of transfer on a bus over which isochronous transfer and asynchronous transfer are mixed.

Isochronous transfer is performed at a priority higher than that of asynchronous transfer. The reason for this is that after a cycle-start packet is issued, isochronous transfer can be started at a gap length (isochronous gap, or "iso gap") that is shorter than the gap length (subaction gap) of an idle interval necessary to start asynchronous transfer. Accordingly, priority is given to isochronous transfer over asynchronous transfer.

In the usual bus cycle shown in FIG. 16, the cycle-start packet is transferred from the cycle master to each node at the start of cycle #m. As a result, a time adjustment is carried out at each node, a node that is to perform isochronous transfer carries out arbitration after waiting the predetermined idle time (isochronous gap) and then enters the packet transfer phase. In FIG. 16, channel e, channel s and channel k are transferred isochronously in the order mentioned.

After the operation from arbitration to packet transfer has been repeated a number of times equal to the number of channels given and all isochronous transfers in cycle #m end, asynchronous transfer can be carried out.

As a result of idle time becoming equal to the subaction gap that makes asynchronous transfer possible, a node that desires to perform an asynchronous transfer judges that a transition has been made to execution of arbitration. However, asynchronous transfers can be made only in a case where the subaction gap for activating asynchronous transfer is obtained in a period of time from the end of an isochronous transfer to the moment (cycle synch) at which the next cycle-start packet is to be transferred.

In the cycle #m in FIG. 16, three channels of isochronous transfers and the subsequent asynchronous transfers (inclusive of ack) transfer two packets (packet 1 and packet 2). Following the asynchronous packet 2, the time (cycle synch) at which cycle #m+1 is to start arrives. As a result, transfer in cycle #m ends at this point.

However, if the time (cycle synch) at which the next cycle-start packet is to be transmitted has arrived during an asynchronous or isochronous transfer operation, the transfer operation is not forcibly interrupted and the cycle-start packet of the next cycle is transmitted after waiting the idle time that follows the end of transfer. In other words, when the first cycle continues for more 125 μs, the next cycle is made correspondingly shorter than the standard 125 μs. That is, the isochronous cycle can be made longer or shorter than the reference 125 μs.

If isochronous transfer is necessary every cycle in order to maintain real-time transfer, then it is executed without fail. As a result of cycle time being shortened, there are also occasions where asynchronous transfer is held over to the ensuing cycle. Such delay information also is managed by the cycle master.

The forgoing is a description of the 1394 serial bus.

Figure 17:
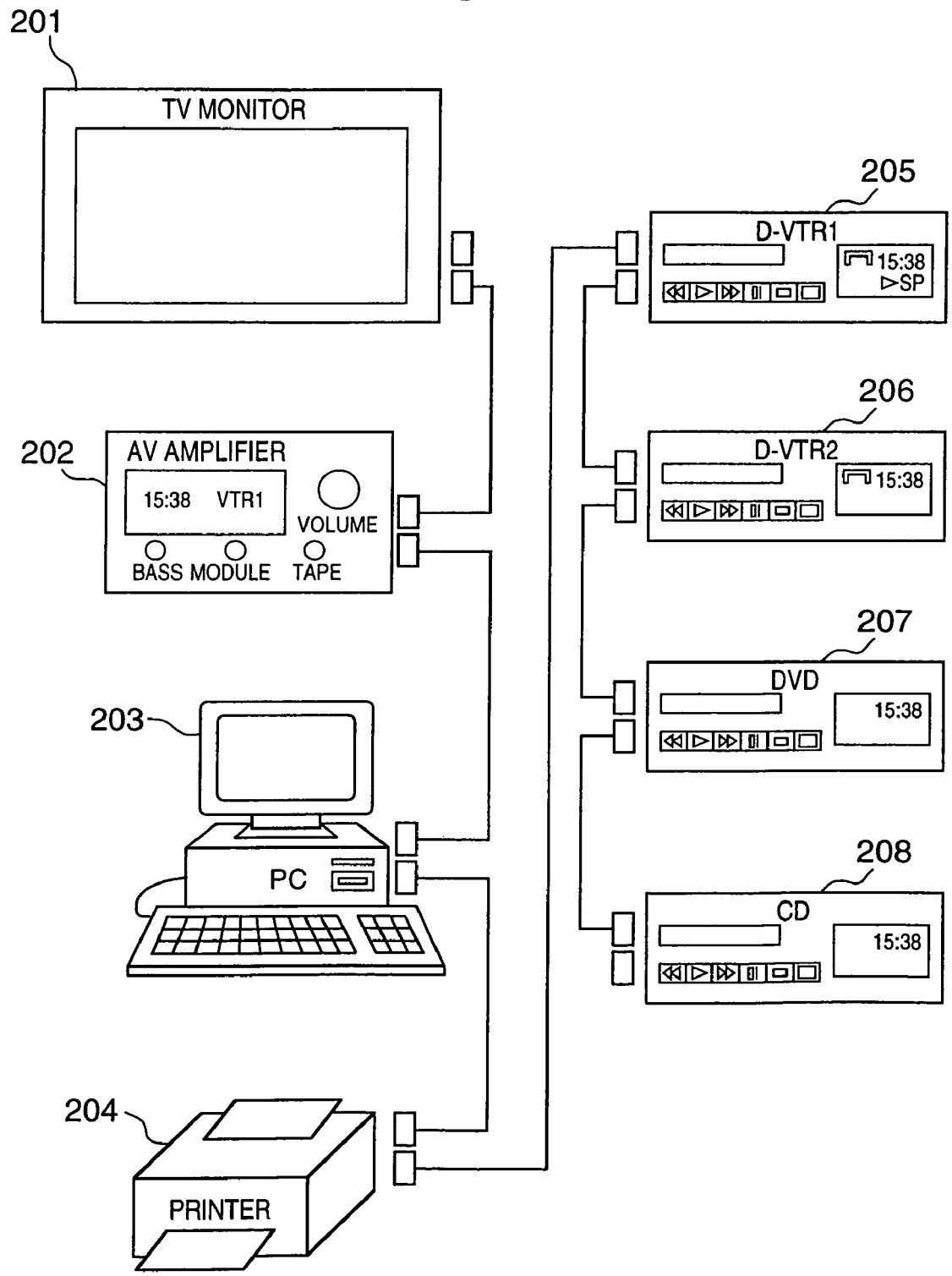
FIG. 17 is a view showing an example of a network constructed using a 1394 serial bus.

FIG. 17 shows an example of the configuration when respective devices are connected via the 1394 serial bus cable.

In FIG. 17, reference numeral 201 denotes a TV monitor; 202, an AV amplifier which is connected to the TV monitor 201 via the 1394 serial bus, selects a specific device from various video and audio devices connected via the 1394 serial bus, and transfers video-audio data from the selected device to the TV monitor 201; 203, a personal computer (to be referred to as a PC) connected to the AV amplifier 202 via the 1394 serial bus; and 204, a printer connected to the PC via the 1394 serial bus.

The PC 203 can receive images from various video devices connected via the 1394 serial bus within a range permitted by laws and the like, and can print out the received images while controlling the printer 204. Reference numeral 205 denotes a first digital VTR connected to the printer via the 1394 serial bus; 206, a second digital VTR connected to the first digital VTR 205 via the 1394 serial bus; 207, a DVD player connected to the second digital VTR 206 via the 1394 serial bus; and 208, a CD player connected to the DVD player via the 1394 serial bus.

Note that the network devices shown in FIG. 17 are merely an example, and the TV monitor 201 and CD player 208 may be further connected to other devices. Any devices, e.g., an external storage device such as a hard disk, second CD player, and second DVD player can be connected so long as they can construct a network via the 1394 serial bus.

An information transmission path including a 1394 I/F will be described by exemplifying I/F connection between the printer 204 and first digital VTR 205 in the network configuration as shown in FIG. 17 with reference to FIG. 18.

Figure 18:
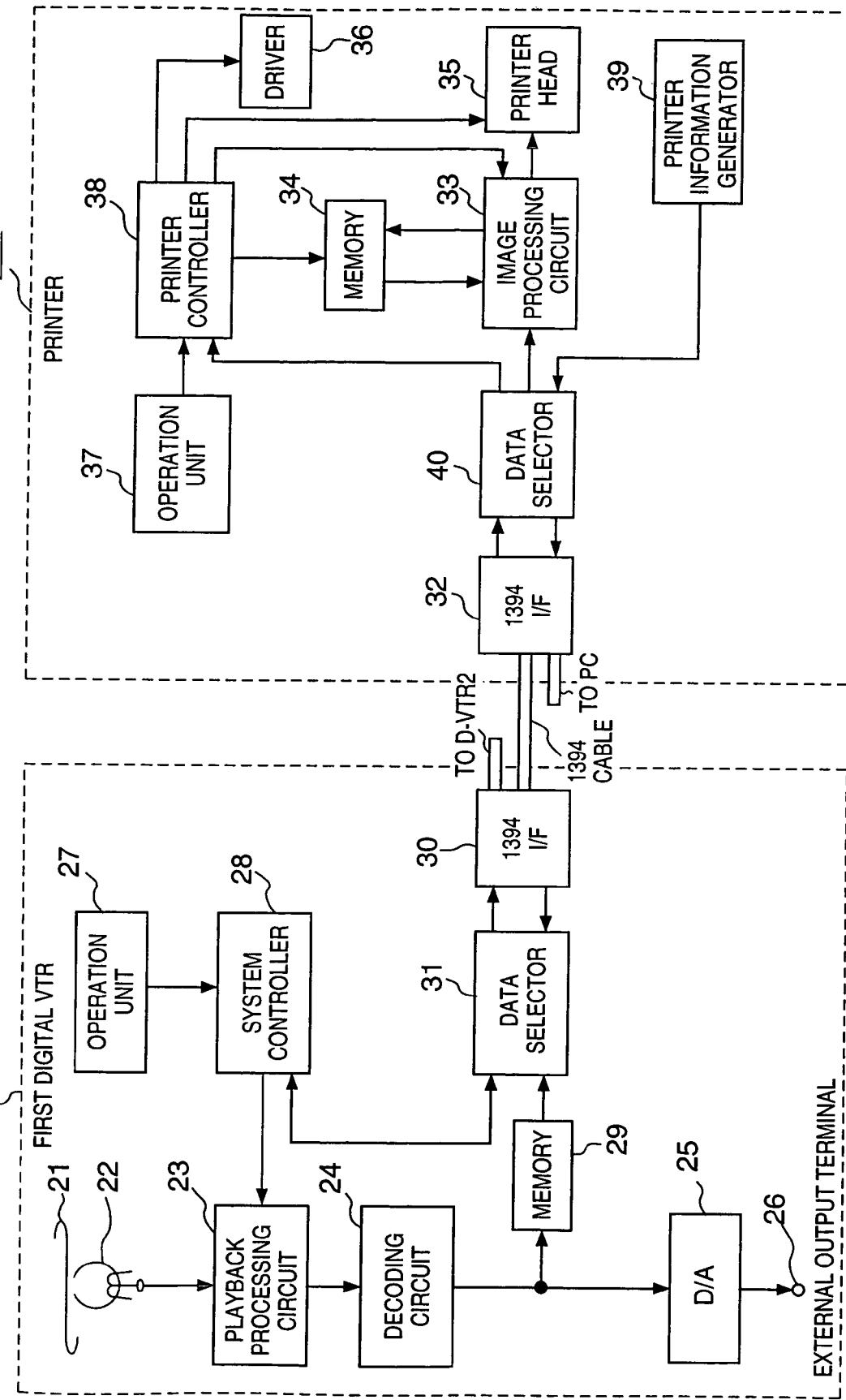
FIG. 18 is a block diagram showing connection between a digital VTR and printer.

In FIG. 18, the network includes the printer 204 and first digital VTR (to be referred to as a VTR) 205.

In the VTR 205, reference numeral 21 denotes a magnetic tape; 22, a recording/playback head; 23, a playback processing circuit; 24, a video decoding circuit; 25, a D/A converter; 26, an external output terminal; 27, an operation unit for inputting instructions; 28, a system controller; 29, a frame memory; 30, a 1394 interface (I/F); and 31, a selector for a plurality of types of data.

In the printer 204, reference numeral 32 denotes a 1394 interface (I/F); 33, an image processing circuit for forming image data into printing image data; 34, a memory for forming image data into printing image data; 35, a printer head; 36, a driver for feeding paper sheets and the like; 37, an operation unit; 38, a printer controller for controlling the printer; 39, a printer information generator for generating the printer status as printer information in order to transmit the status via the 1394 I/F; and 40, a data selector. FIG. 18 shows only the playback system of the VTR 205.

The operations of the VTR 205 and printer 204 connected as shown in FIG. 17 will be explained.

Video data recorded on the magnetic tape 21 is read by the recording/playback head 22, and subjected to playback processing by the playback processing circuit 23. The read video data is generally recorded after being encoded by a predetermined compression scheme based on DCT (Discrete Cosine Transformation) and VLC (Variable-Length Coding) as band compression methods for home digital videos. Thus, the read video data is subjected to corresponding decoding processing by the decoding circuit 24, converted into an analog signal by the D/A converter 25, and output to an external device via the external output terminal 26.

When desired video data or the like is to be transferred to another node using the 1394 serial bus, video data decoded by the decoding circuit 24 is temporarily stored in the frame memory 29, sent to the 1394 I/F 30 via the data selector 31, and transferred to, e.g., the printer 204 and PC 203. The data selector 31 transfers various control data from the system controller 28 to the 1394 I/F 30 in addition to the video data.

If the transferred data is direct-printing data output to the printer 204, the printer 204 receives this video data; and if the data is to be transferred to another node such as the PC 203, it is transferred to the next node through the 1394 I/F 32.

In the VTR 205, a VTR instruction such as a playback operation instruction is input via the operation unit 27. The system controller 28 controls various operation units including the playback processing circuit 23 on the basis of an instruction input via the operation unit 27. For a predetermined instruction input, the system controller 28 generates a control command for, e.g., the printer 204, and transfers it as command data from the 1394 I/F 30 to the printer 204 via the data selector 31.

Printer information data such as the printer operation status sent from the printer 204 via the 1394 serial bus can be input from the 1394 I/F 30 to the system controller 28 via the data selector 31. If the printer information data is not necessary for the VTR 205, it is transferred to the second digital VTR 206 through the VTR 205. The printer information can also be transferred from the 1394 I/F 32 to the PC 203.

The data selector 31 of the VTR 205 and the data selector 40 of the printer 204 select input data or output data. The data selectors 31 and 40 sequentially classify respective data into the types of data, and input/output them to/from predetermined blocks.

In the printer 204, data input via the 1394 I/F 32 are classified into the types of data by the data selector 40. Data to be printed is input to the image processing circuit 33. The image processing circuit 33 performs image processing suited to the printer for input data to form printing image data, and stores the printing image data in the memory 34 controlled by the printer controller 38. The printing image data is sent from the memory 34 read-controlled by the printer controller 38 to the printer head 35 which prints the data.

The driver 36 drives the printer head 35 and feeds paper sheets. The operations of the driver 36 and printer head 35 are controlled by the printer controller 38. The operation unit 37 allows inputting instructions for paper feed, reset, ink check, printer operation such as standby/stop operation. The printer controller 38 controls respective units in accordance with an instruction input via the operation unit 37.

When data input to the 1394 I/F 32 indicates a command to the printer 204 generated from the PC 203, VTR 205, or the like, the data is transmitted as a control command to the printer controller 38 via the data selector 40, and the printer controller 38 controls respective printer portions corresponding to the control command.

The printer information generator 39 outputs, as printer information, a message representing the printer operation status and printing end/start enable state, a warning message representing a paper sheet jam, operation error, presence/absence of ink, or the like, and printing image information. This printer information is transferred to the data selector 40, then externally output via the 1394 I/F 32.

The PC 203 and VTR 205 perform display and processing corresponding to the printer status on the basis of the output printer information. A user watches a message and printing image information displayed on the PC 203 (also on the VTR 205 if it has a direct-printing function) based on the printer information. The user inputs a command for the printer 204 via the PC 203 (and VTR 205) in order to appropriately deal with the status. The input command is transmitted as control command data via the 1394 serial bus. Based on this control command, the printer controller 38 can control the operations of the respective portions of the printer 204 and printing image data in the image processing circuit 33.

In this manner, video data, various command data, and the like are transferred onto the 1394 serial bus which connects the PC, VTR, and printer. The transfer format of data transferred from the VTR 205 is based on the above-described 1394 serial bus specifications. Video data (and audio data) is mainly transferred as Iso data on the 1394 serial bus by an isochronous transfer scheme, and command data is transferred as Async data by an asynchronous transfer scheme.

A certain type of data may be transferred by the asynchronous transfer scheme better than the isochronous transfer scheme. In this case, the asynchronous transfer scheme is used.

Printer information data transferred from the printer 204 is transferred as Async data by the asynchronous transfer scheme. However, printing image data having a large amount of information may be transferred as Iso data by the isochronous transfer scheme.

When the network as shown in FIG. 17 is constructed by the 1394 serial bus, both the VTR 205 and printer 204 can bidirectionally transfer data to the PC 203, VTR 206, DVD player 207, CD player 208, AV amplifier 202, TV monitor 201, and the like on the basis of the 1394 serial bus specifications.

The TV monitor 201, AV amplifier 202, PC 203, VTR 206, DVD player 207, and CD player 208 have unique function controllers. In these devices, however, the portions necessary for information communication via the 1394 I/F, i.e., the data selector for receiving data to be transmitted from respective blocks within the device and properly distributing the received data to respective blocks within the device, and the 1394 I/F are the same as in the VTR 205 and printer 204.

The foregoing is an overview of the IEEE 1394 technique.

The system according to the first embodiment of the present invention will be described in detail.

Figure 19:
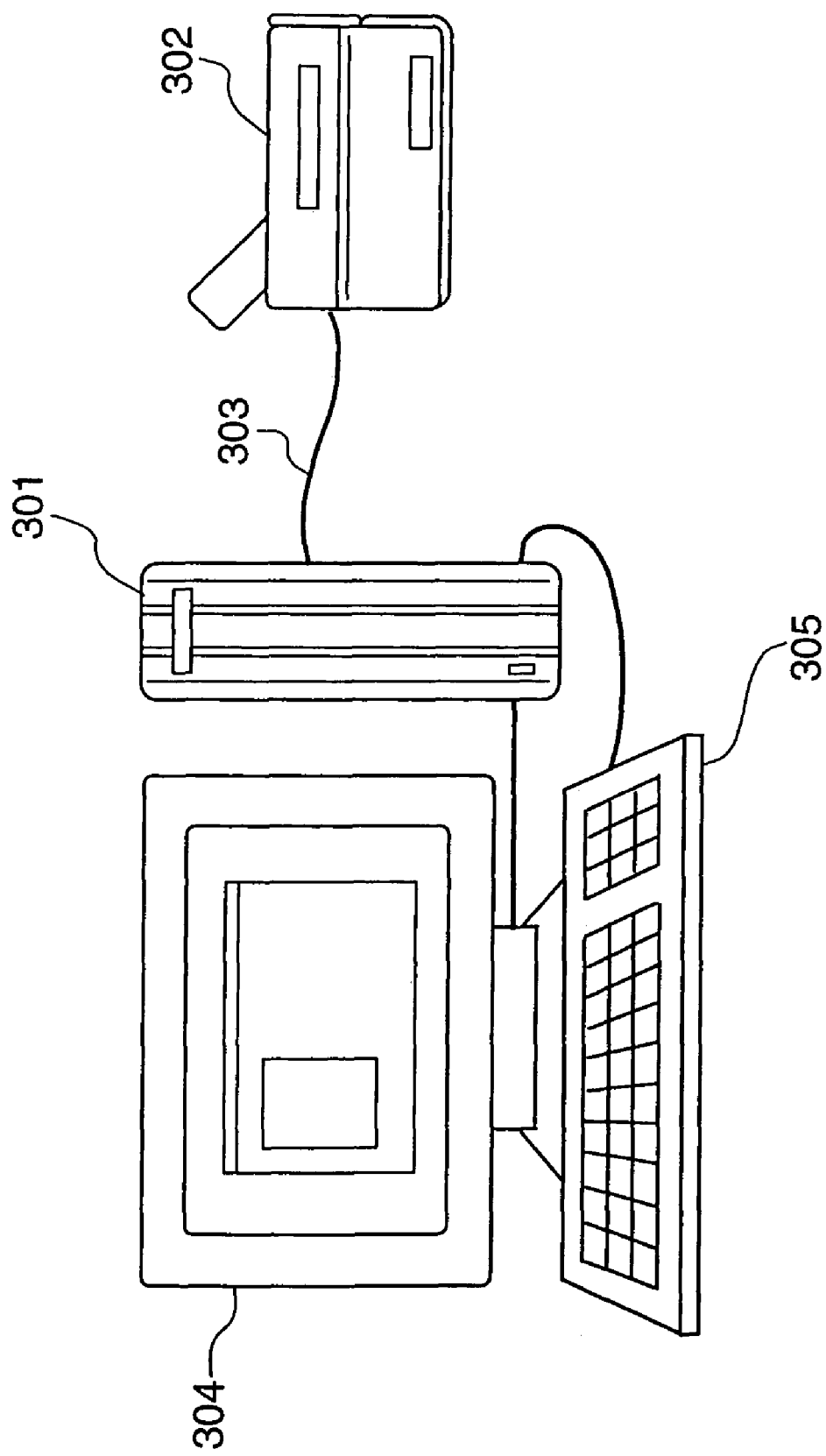
FIG. 19 is a view showing an example of a system configuration in the first embodiment of the present invention.

FIG. 19 shows an example of the system configuration in the first embodiment of the present invention.

In FIG. 19, a PC 301 in which photographing condition management software is installed is connected to a digital video camera (to be referred to as a DVC) 302 via an IEEE 1394 cable 303, and comprises a monitor 304 and keyboard 305.

Figure 20:
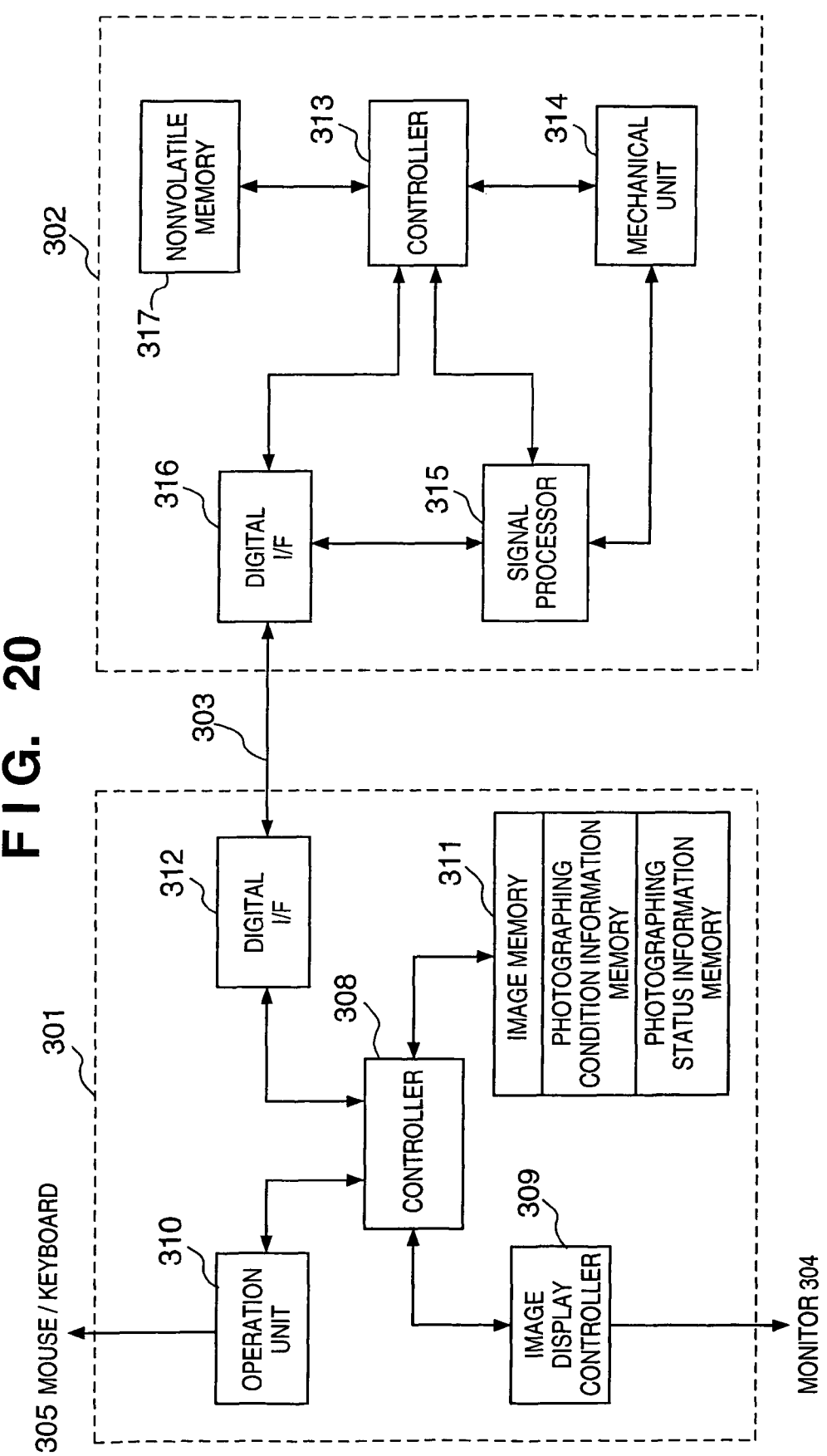
FIG. 20 is a block diagram showing the schematic arrangement of a PC and DVC in the first embodiment of the present invention.

FIG. 20 is a block diagram showing the schematic arrangement of the PC 301 and DVC 302.

FIG. 20 shows only the function of the PC 301 necessary for starting and running the photographing condition management software, and the function of the DVC 302 necessary for communicating necessary information with the PC 301, and the remaining arrangement is not illustrated.

The PC 301 incorporates a controller 308 for controlling the start of software, a monitor display image, and a read of information input via the keyboard 305 or the like, image-display controller 309 for outputting monitor display image information, operation unit 310 for reading an input via the keyboard or the like and transmitting information to the controller 308, memory 311 for storing image information, photographing condition information, and photographing status information, and a digital I/F 312 for communicating digital information with the DVC 302 and the like.

The DVC 302 incorporates a controller 313 for controlling a mechanical unit 314 and signal processor 315, mechanical unit 314 for playing back data from a magnetic tape, the signal processor 315 for processing a playback signal from the magnetic tape, a digital I/F 316 for performing digital communication with the PC 301 and the like, and a nonvolatile memory 317 used to record information transmitted from the PC 301 and the like.

The DVC 302 and PC 301 recognize the IEEE 1394 cable 303 when it is connected, and determine whether to enter mode setting operation.

Figure 21:
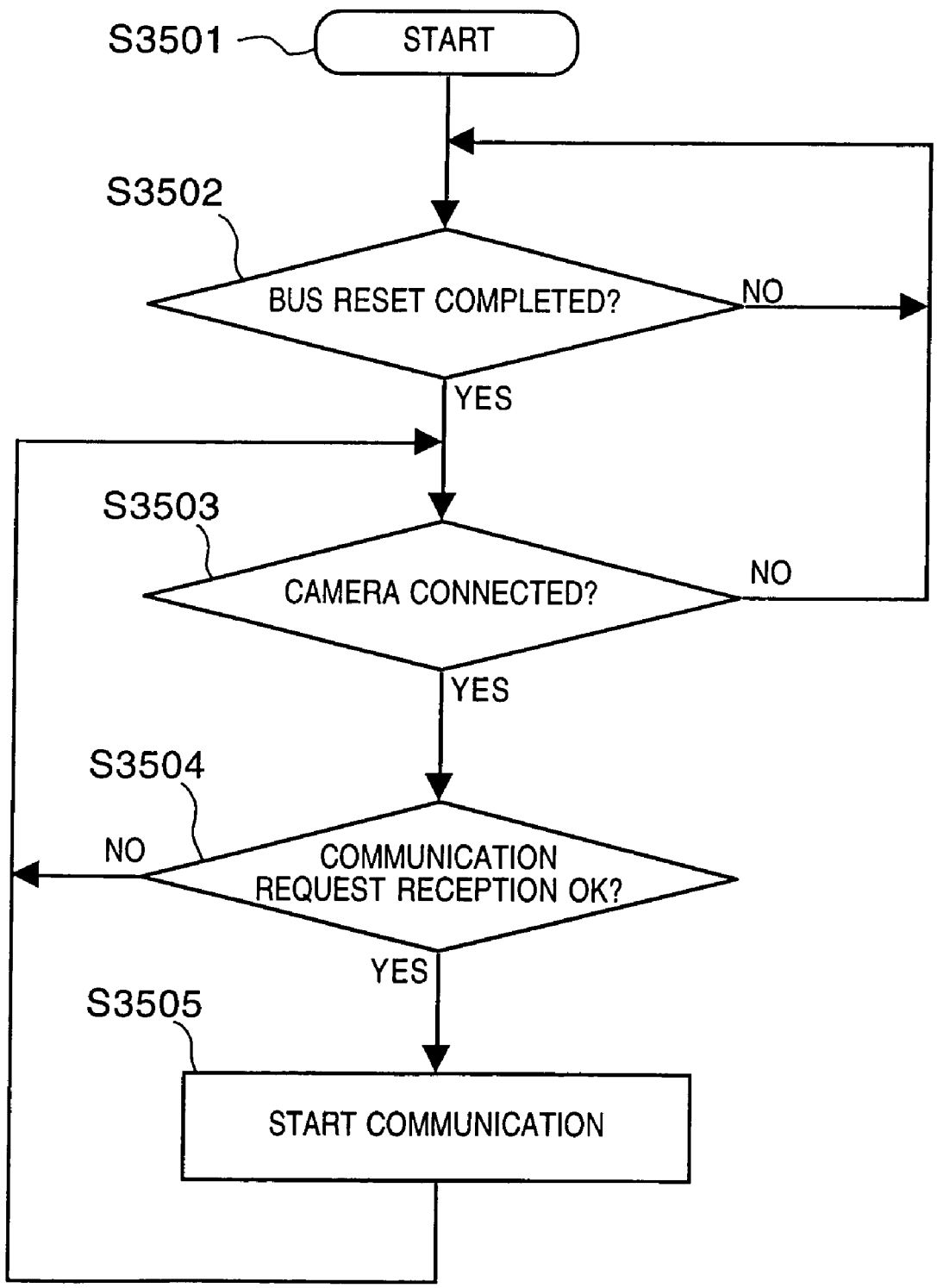
FIG. 21 is a flowchart showing processing of the PC for recognizing connection to the DVC.

FIG. 21 is a flowchart showing processing of the PC 301 for recognizing connection to the DVC 302.

If processing starts at step S3501, whether the IEEE 1394 cable 303 is connected is checked at step S3502 by detecting generation of a bus reset signal.

If NO at step S3502, the flow waits without executing any processing. If YES at step S3502, whether the DVC 302 is connected is checked at step S3503. According to a method of identifying whether the DVC is connected, for example, a 64-bit address in the address space on the 1394 serial bus of the DVC shown in FIG. 3 is read to identify whether the DVC is subjected to communication.

If NO at step S3503, the flow returns to step S3502. If YES at step S3503, whether the DVC 302 can receive a communication request from the PC 301 is checked at step S3504. If NO at step S3504, the flow returns to step S3503. Whether the DVC to be controlled is still connected is confirmed, and then processing at step S3504 is executed again.

If YES at step S3504, digital video (DV) information is transmitted from the DVC 302, and photographing condition information and control information are transmitted from the PC 301 at step S3505. Using the IEEE 1394 allows mutually inputting and outputting information in real time.

When the DVC 302 is set in a playback mode in which video data recorded on a magnetic tape is played back, playback video information is transmitted to the PC 301 via the IEEE 1394 cable 303. When the photographing condition management software starts on the PC 301, the transmitted video information is expanded and displayed on the monitor 304 connected to the PC 301.

Figure 22:
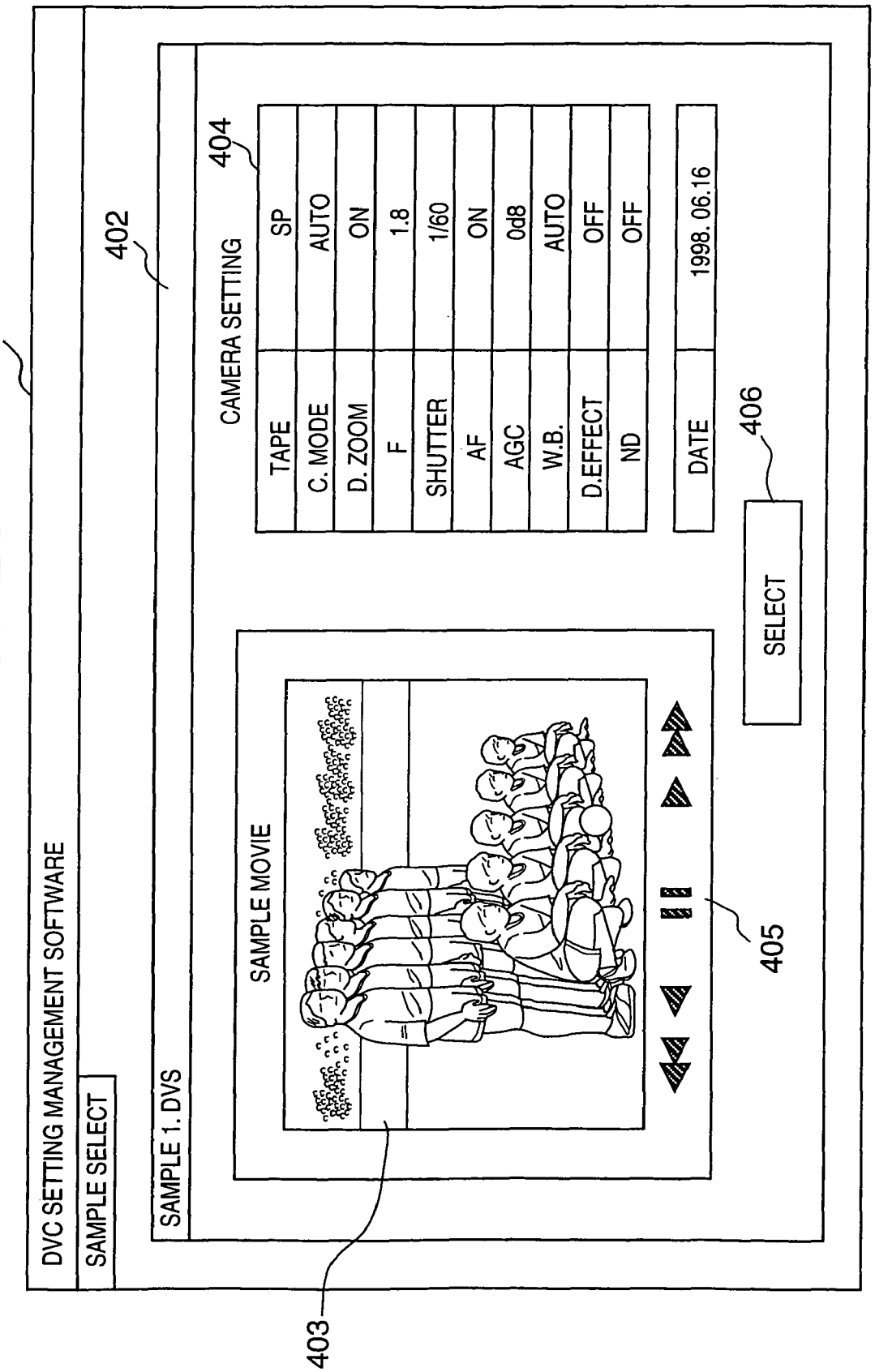
FIG. 22 is a view showing an example of a photographing condition management software window in the first embodiment of the present invention.

The display screen when video information is displayed in the first embodiment of the present invention is shown in FIG. 22.

Since the photographing condition management software has start, the screen shown in FIG. 22 displays a start window 401, and displays at an upper left corner a SAMPLE SELECT display representing that a photographing condition sample is being selected from a playback image. A selection window 402 for displaying a playback image is displayed on the start window 401.

The selection window 402 displays in real time together with a playback frame 403 photographing condition information (right table 404 in the selection window 402) read from system data included in playback information.

Playback mode command switches 405 for executing normal playback, x1-speed reverse playback, high-speed reverse playback, high-speed playback, pause, and the like are displayed below the playback frame 403. A user can click these switches with a mouse pointer or the like to freely select a frame to be stored as a sample.

This playback mode information is transmitted to the DVC 302 via the IEEE 1394 cable 303. The DVC 302 having received this information can change the setting of the playback mode in accordance with the information to synchronize an instruction via the command switch and the image playback mode.

After a frame to be selected as a sample is determined, the user clicks a SELECT switch 406 displayed at the bottom of the window 402 with the mouse pointer or the like. Then, one playback frame just in clicking and photographing condition information displayed in real time are stored in the memory 311 of the PC in association with each other.

After recording, arbitrary photographing status information stored in the memory 311 together with sample information is set. The photographing status information is information considered to greatly influence the quality of a recorded image. This information includes the recording place, recording season, recording target that moves actively or inactively. These pieces of information are too large in information amount to record all on a magnetic tape, so that they are set on the PC.

To set the photographing status information, the selection window 402 disappears from the screen and is switched to a photographing status setting window 501 after a sample frame is selected, and image information and photographing condition information of the sample frame are recorded.

Figure 23:
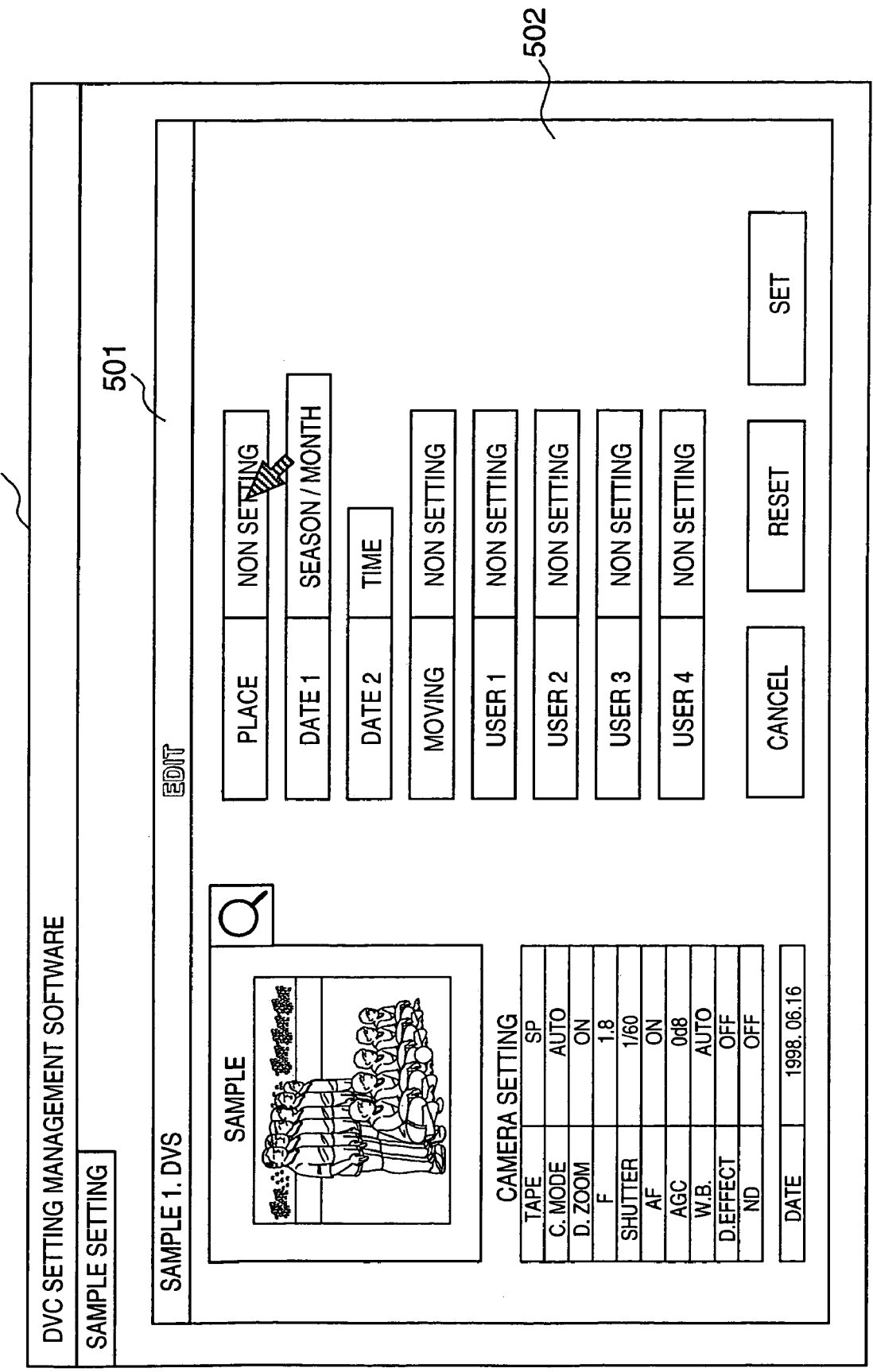
FIG. 23 is a view showing an example of a display screen in starting a setting window for setting the photographing status for a sample.

FIG. 23 shows the switched screen.

The photographing status setting window 501 displays the selected sample image and photographing condition. Items 502 for setting the photographing status are displayed right in the window 501. The recording place (PLACE), rough recording time (DATE 1) such as the recording season and month, recording time (DATE 2), moving frequency (MOVING) representing that an object moves actively or inactively are initially set as photographing status items.

If the user wants to set other items, he/she can set them using USER 1, USER 2, USER 3, and USER 4.

Figure 24:
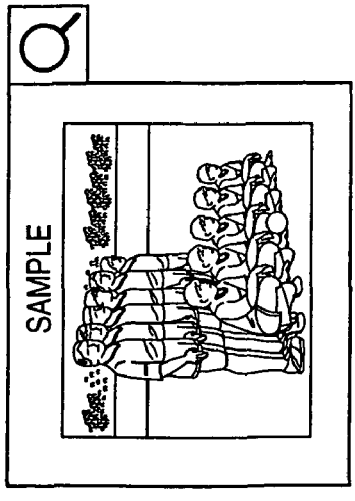
FIG. 24 is a view useful in describing a photographing status setting method in the first embodiment of the present invention.
Figure 25A:
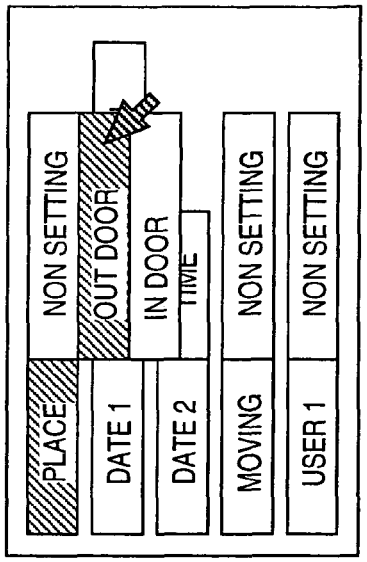
FIGS. 25A to 25D are views useful in describing the photographing status setting method in the first embodiment of the present invention.

The photographing status setting method will be explained in short. For example, when the recording place is to be set, the user selects NON SETTING adjacent to the item PLACE with the mouse pointer or the like in FIG. 23. Then, the background color of the selected NON SETTING changes (shown in FIG. 24), and a setting selection window appears (701 in FIG. 25A). This setting selection window 701 displays items INDOOR and OUTDOOR so as to allow selecting between outdoor recording and indoor recording.

Figure 25B:
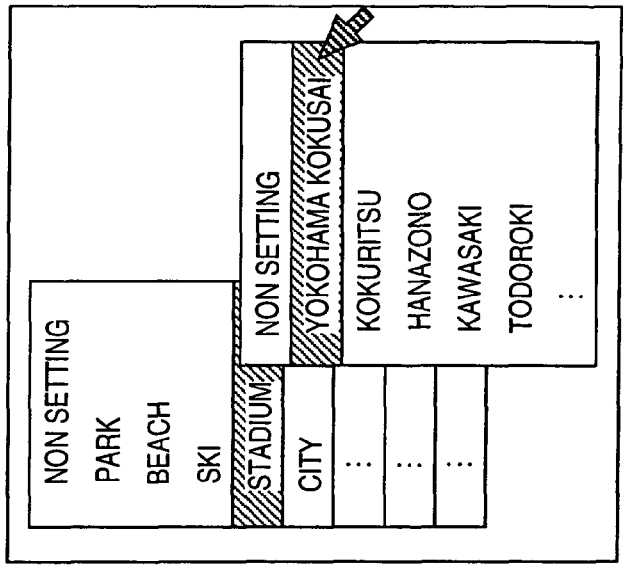
Figure 25C:
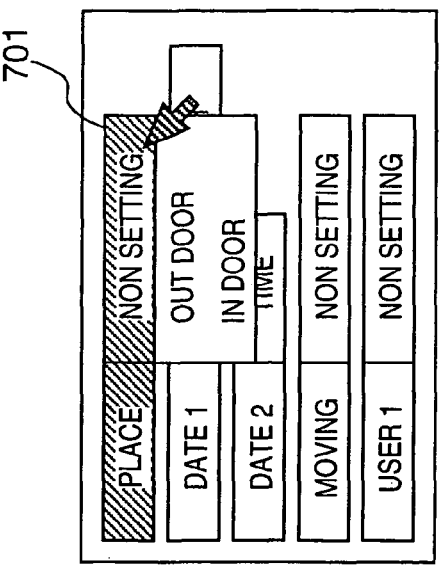
Figure 25D:
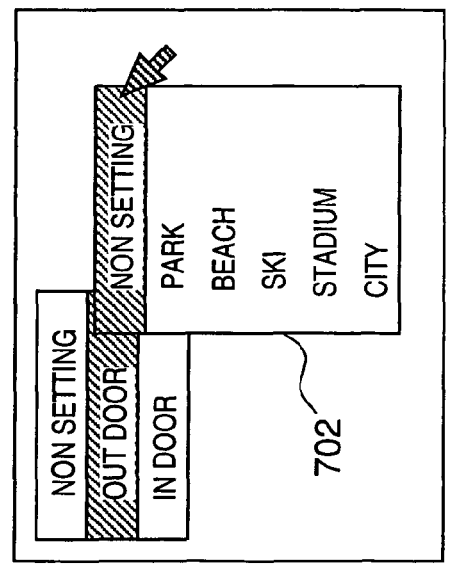

In this case, since the photographing frame of an outdoor sport is selected as a sample, the user selects OUTDOOR (FIG. 25B). Then, a selection window 702 for selecting an outdoor place where photographing was done is displayed (FIG. 25C). If the user selects, e.g., a STADIUM item indicating a stadium, he/she can set the stadium where photographing was done (FIG. 25D). In this case, the user selects YOKOHAMA KOKUSAI.

Figure 26:
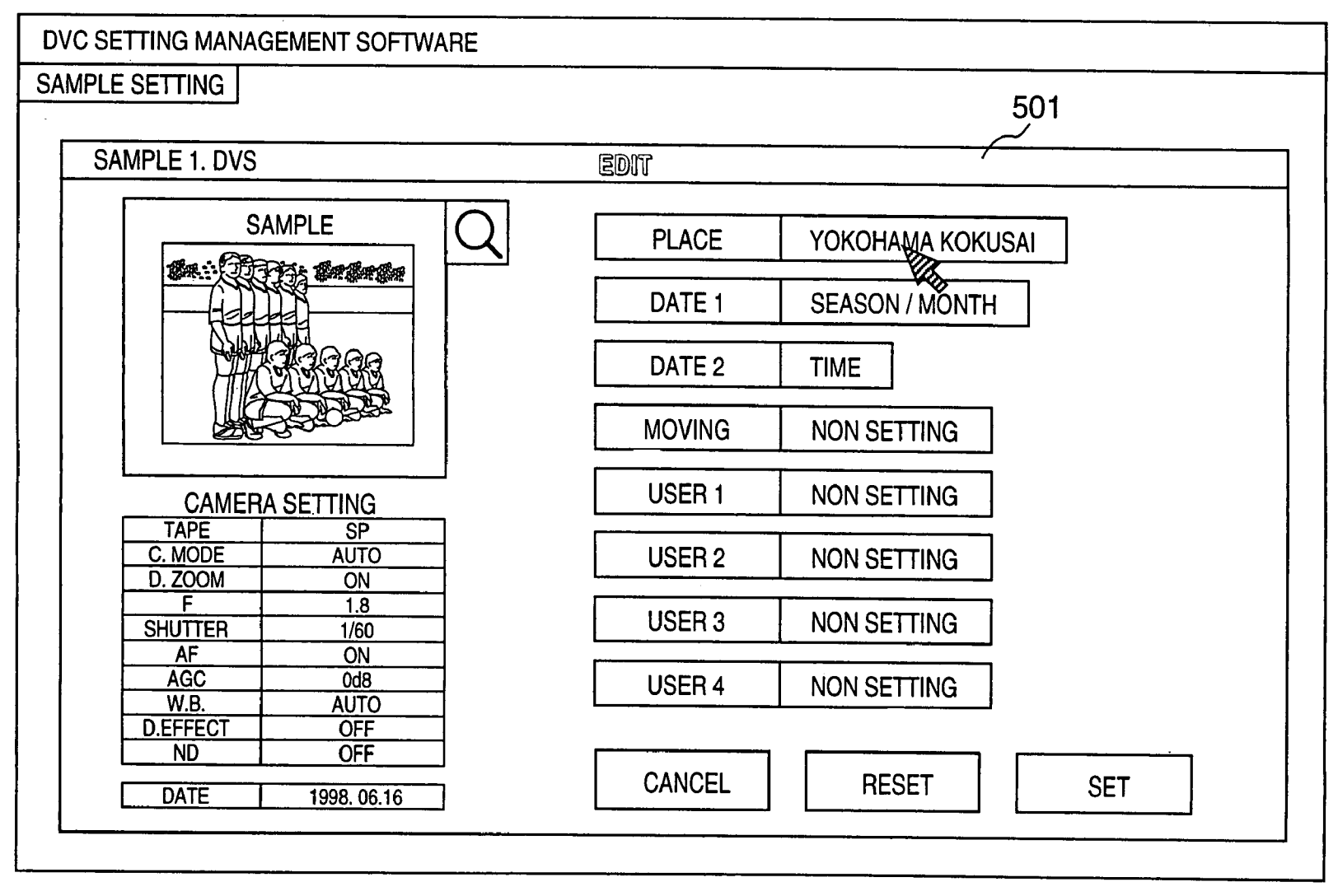

FIG. 26 shows the photographing status setting window 501 after these settings. By the above setting operation, the PLACE item representing the photographing place is set to YOKOHAMA KOKUSAI.

Figure 27:
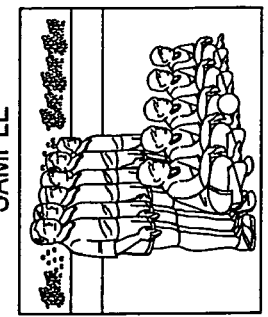
FIG. 27 is a view showing a display example of the setting window after setting the photographing status.

FIG. 27 shows an example of the setting window 501 after the photographing time, moving frequency of a photographing object, and the like are similarly set.

The method of setting the photographing status setting items prepared on the software side in advance has been described. Some users may require other setting items, add or delete existing items, or change item names. Such item setting method will be described below.

Figure 28:
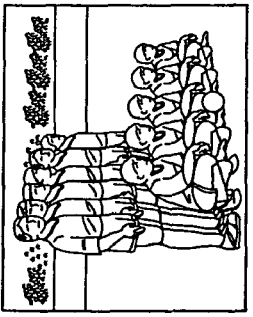
FIG. 28 is a view useful in describing operation of changing the photographing status item.

To change the item name, EDIT at the top of the setting window 501 is selected with the mouse pointer or the like (FIG. 28). Then, the selected EDIT character changes in color to represent that EDIT is selected.

Figure 29:
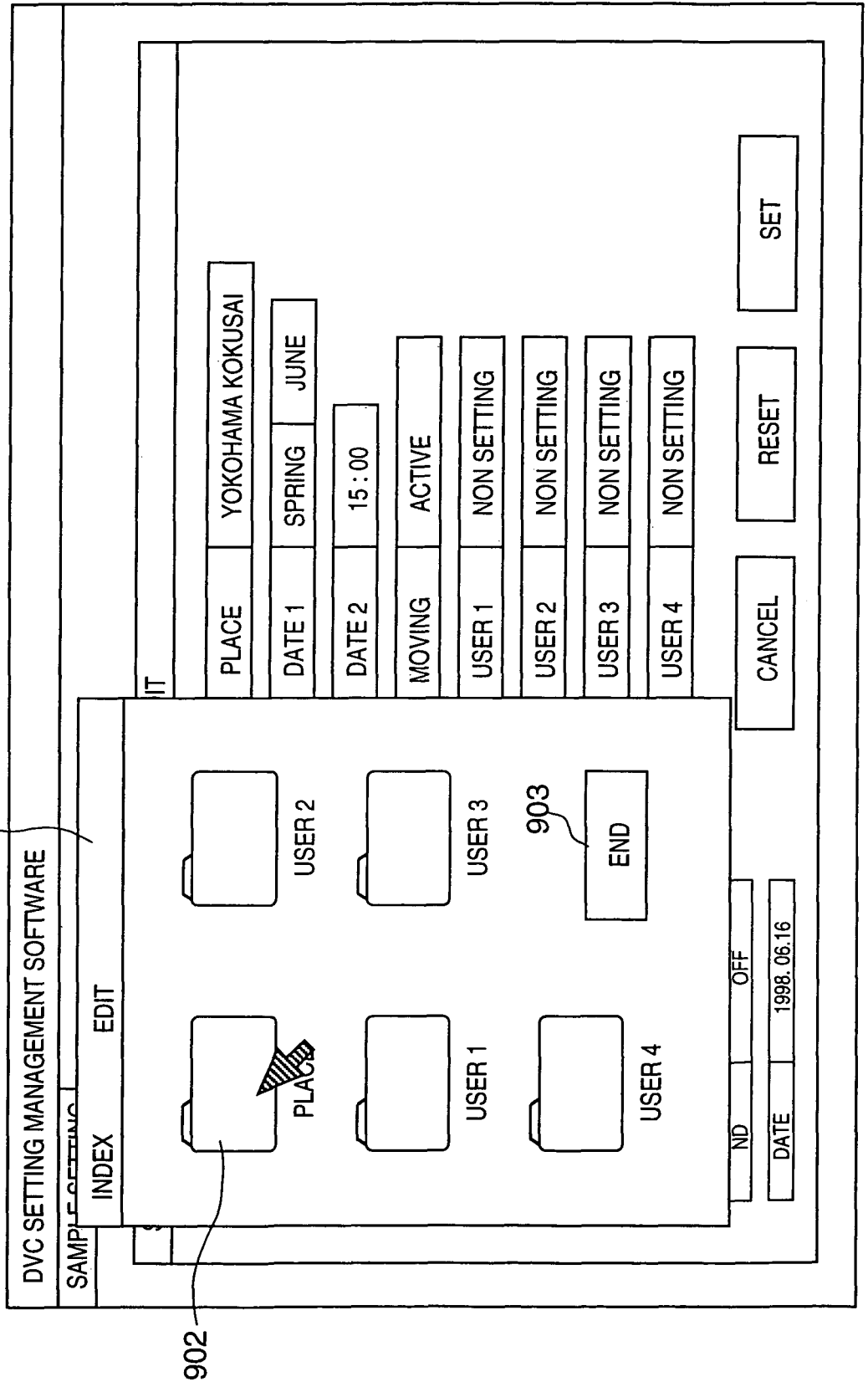
FIG. 29 is a view showing a display example of a photographing status item edit window.

An edit window 901 for editing the item name is displayed (FIG. 29). This window 901 displays, as files, editable items among setting items, and an END switch 903 for ending the edition.

A method of editing the PLACE item representing the photographing place will be exemplified. If the user selects a PLACE folder 902 with the mouse pointer, the display within the edit window changes to display an OUTDOOR folder 1001 and INDOOR folder 1008 included in the PLACE folder 902 (FIG. 30A). If the user selects the OUTDOOR folder, photographing place folders included in the OUTDOOR folder 1001 are displayed (FIG. 30B).

If the user selects a STADIUM folder 1004 corresponding to the photographing place, photographing place folders included in the STADIUM folder 1004 are displayed (FIG. 30C).

In the above-mentioned sample setting, the photographing place is limited to OUTDOOR>STADIUM>YOKOHAMA KOKUSAI as photographing place information. This limitation is, however, insufficient for a given user. For example, the user may want to further add a limitation that an object is near the center of the stadium field (bright, far photographing object) not on a spectator seat (dark, near photographing object).

For this purpose, the user selects a YOKOHAMA KOKUSAI folder 1005 indicating YOKOHAMA KOKUSAI STADIUM. Since the stadium name has already been registered but no more detailed settings are done, the display screen displays only an unnamed folder 1006 (FIG. 30D). Since most of the current photographed images are those of an object near the center of the stadium field, the user can set a name representing a limitation "MID FIELD" as the name of the unnamed folder 1006 using a keyboard or the like (FIG. 30E).

When the user wants to set "spectator seat", "stadium entrance", and the like, he/she can select a MAKE A NEW CATEGORY switch 1002 to create a new folder. Also when the user wants to delete an existing folder, he/she can delete a folder selected with the mouse pointer or the like using a CLEAR CATEGORY switch 1003.

If necessary, the user can set the USER 1, USER 2, USER 3, and USER 4 items.

Figure 31:
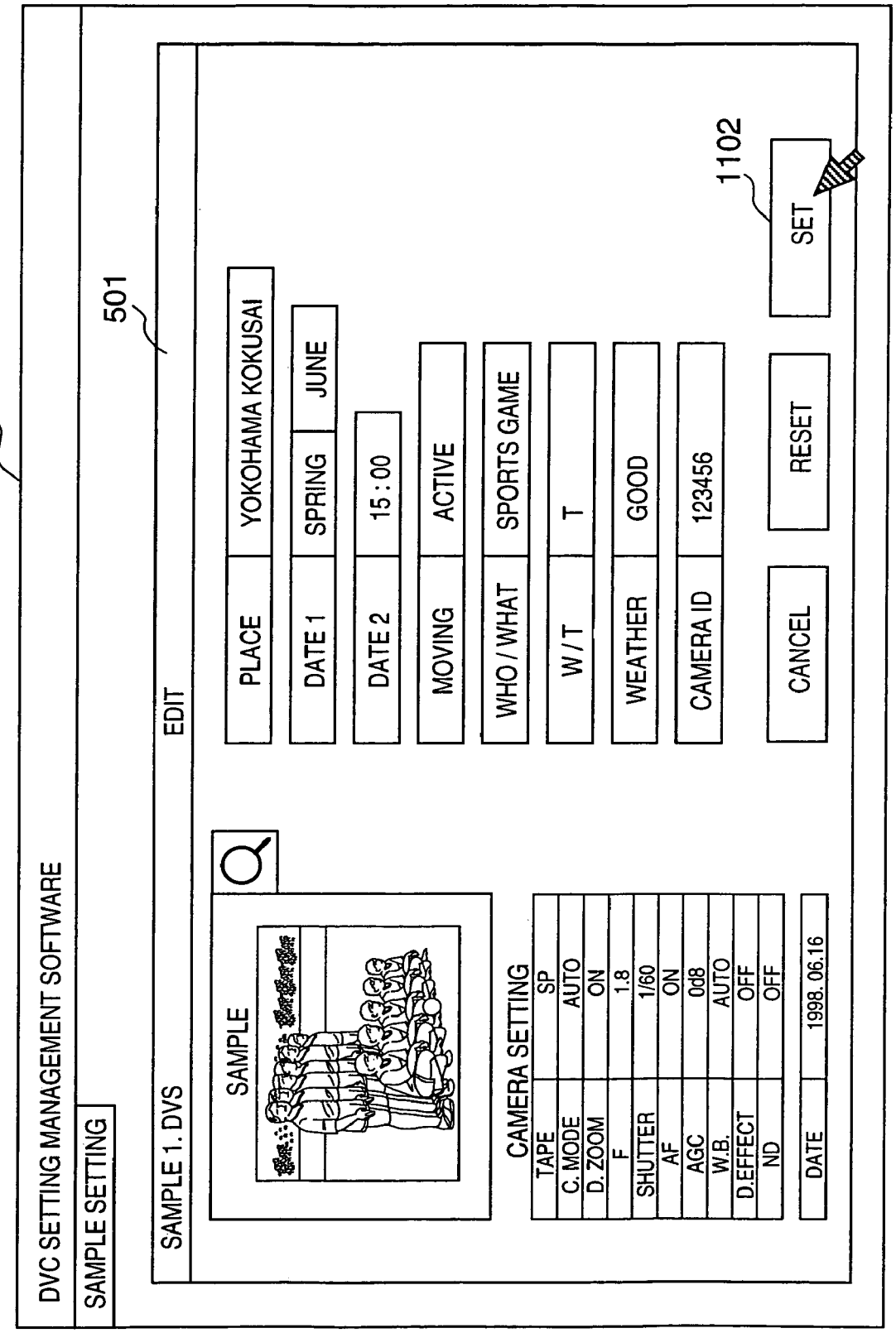
FIG. 31 is a view showing the setting window after photographing status items are edited and set.

FIG. 31 shows an example of the setting window 501 after the photographing status items are edited and the user items are also set. The user items are changed to item names:
  USER 1→WHO/WHAT (photographing object)
  USER 2→W/T (wide/telephoto)
  USER 3→WEATHER (weather)
  USER 4→CAMERA ID (video camera ID)
The respective items are set to
  WHO/WHAT→SPORTS GAME
  W/T→T
  WEATHER→GOOD
  CAMERA ID→123456

The camera ID is an ID unique to the video camera in consideration of that, when a plurality of video cameras are used, photographed images change depending on a video camera used for photographing even for the same photographing object.

After the photographing status is set in the above manner, the user ends setting by clicking a SET switch 1102 with the mouse pointer. At the same time as clicking, camera photographing condition information and photographing status information are stored in the memory together with images.

A method of searching for the photographing condition and photographing status stored with being linked with a sample image will be explained.

FIG. 32 shows a search window 1201. The search method includes three methods, i.e., a method (PICTURE SEARCH) of searching for the photographing condition and photographing status of an almost ideal image or picture, a method (CAMERA MODE SEARCH) of searching from an arbitrary photographing condition, and a method (RECORDING CONDITION SEARCH) of searching from photographing status items. The search window 1201 displays switches 1202 to 1204 corresponding to the respective search methods.

Figure 33A:
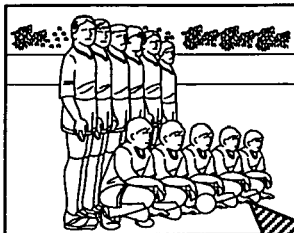
FIGS. 33A and 33B are views respectively showing a search window in a search based on a sample image, and a search result window.

The picture search method will be described. The user clicks the PICTURE switch 1202 with the mouse pointer or the like to display a PICTURE SEARCH window 1301 (FIG. 33A). Then, all pictures recorded as samples are displayed on the window. The user can search for the photographing condition and photographing status by selecting a picture near an ideal picture to be photographed.

To select a picture, the user clicks a picture wanted to select with the mouse pointer or the like. Then, a search result window 1302 displaying the selected picture, photographing condition, and photographing status is displayed (FIG. 33B).

The photographing condition search method will be described. The user clicks the CAMERA MODE switch 1203 in the search window 1201 shown in FIG. 32 with the mouse pointer or the like to display a CAMERA MODE SEARCH window 1401 (FIG. 34A). The window 1401 displays a list of photographing conditions to allow the user to set the setting contents similarly in sample setting.

Figure 33B:

After the user sets a necessary setting condition, he/she clicks a SEARCH switch as a search start switch to display a sample picture corresponding to the resultant setting condition on a search result selection window 1403 (FIG. 34C) Consequently, the user can display the search result window 1302 as shown in FIG. 33B by clicking a sample picture to be searched for.

This also applies to the photographing condition search method. The user clicks a RECORDING CONDITION switch in the search window 1201 shown in FIG. 32 to display a photographing condition window 1402 (FIG. 34B). The user sets a desired photographing condition, and selects a sample to be searched for from corresponding sample pictures displayed as shown in FIG. 34C. As a result, the user can display the search window 1302 as shown in FIG. 33B. The foregoing is a description of the recorded-sample search method.

According to the first embodiment, arbitrary information such as the photographing condition and photographing status can be added to photographed video information. This allows determining the photographing condition with reference to arbitrary information when a photographer takes a picture.

Since arbitrary information accessory to the photographing condition can be searched for from the photographing condition, the photographing condition can be easily examined and determined. Since photographing condition can be searched for from information about an arbitrary photographing status, the photographing condition can be easily examined and determined.

Second Embodiment

The second embodiment will be described.

The second embodiment concerns a method of setting a photographing condition obtained as a result of a search in a digital video camera.

FIG. 35A shows a search result window 1302. The case of transporting photographing condition data displayed on this window 1302 to the DVC will be explained.

The search result window 1302 displays a photographing condition transport switch 1501. The user clicks the switch 1501 with the mouse pointer or the like to display a transport setting window 1503 (FIG. 35B). The window 1503 is displayed in the search result window 1302.

Each condition is displayed with "→" and "x". By selecting "→" and "x" for each setting, the user can select whether to transport photographing condition data to the DVC. This allows transporting only necessary photographing condition to the video camera and coping with various photographing conditions.

After the user selects transport data, he/she starts transporting the data by clicking a START TRANSPORT switch 1502 for starting transporting photographing condition data. The DVC having received the transported photographing condition information stores the information in a nonvolatile memory. The stored photographing condition information can be read out, as needed, and can be used as one photographing mode.

Figure 36:
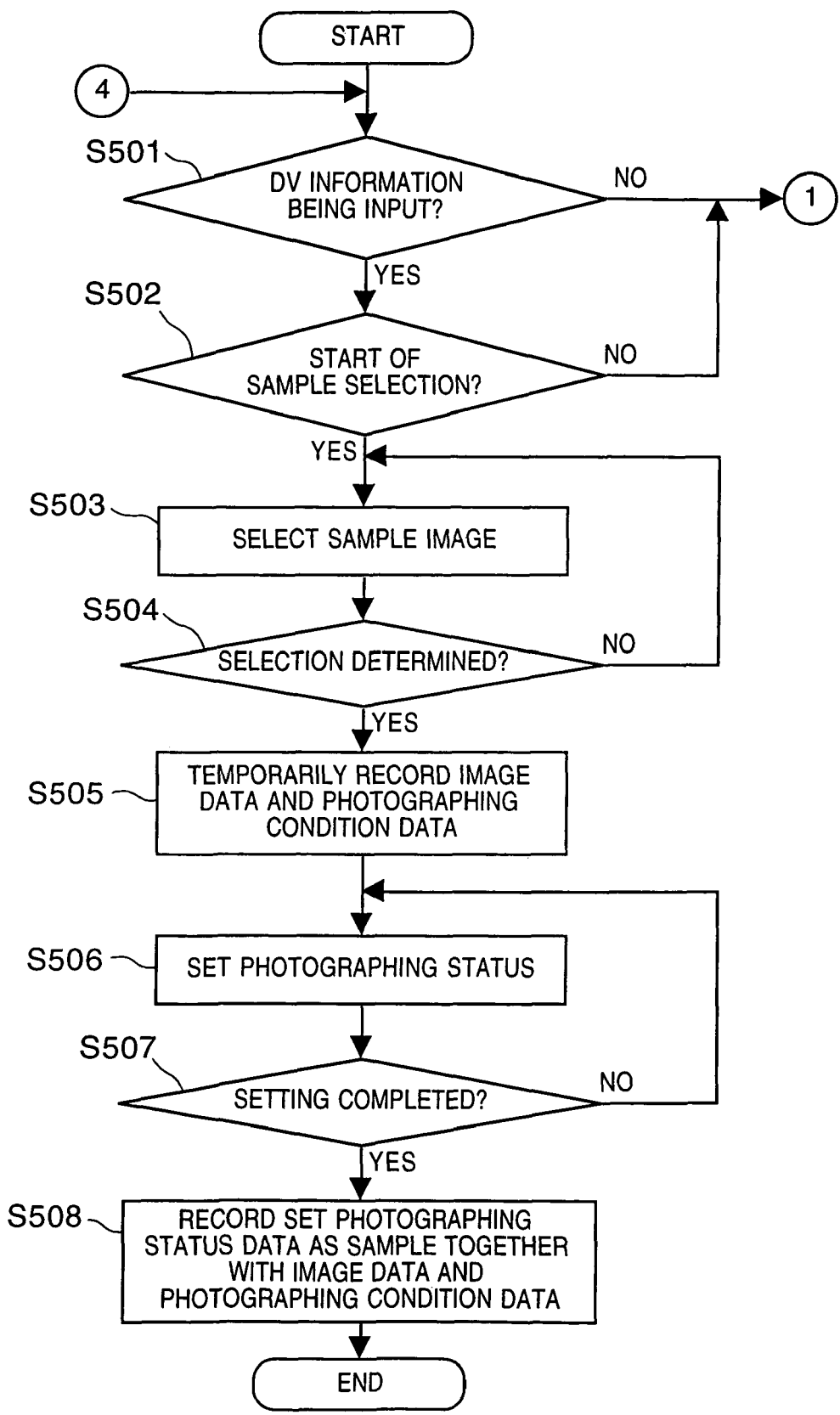
FIG. 36 is a flowchart showing processing for selecting a sample and setting the photographing condition and photographing status in the second embodiment of the present invention.

FIG. 36 is a flowchart showing control of photographing condition management software executed by a PC 301 in selecting a sample image.

At step S501, whether DV information (including image information and photographing condition information) is being transmitted from the DVC is checked. If YES at step S501, whether the current mode is a sample selection mode is checked from the DV information at step S502. If YES at step S502, the flow advances to step S503 to select a sample image.

Upon completion of selection at step S504, image data and photographing condition data are temporarily stored in a memory at step S505, and the photographing status is set at step S506. Upon completion of setting (YES at step S507), the set photographing condition data, image data, and photographing status data are stored as one sample information in the memory at step S508.

Figure 37:
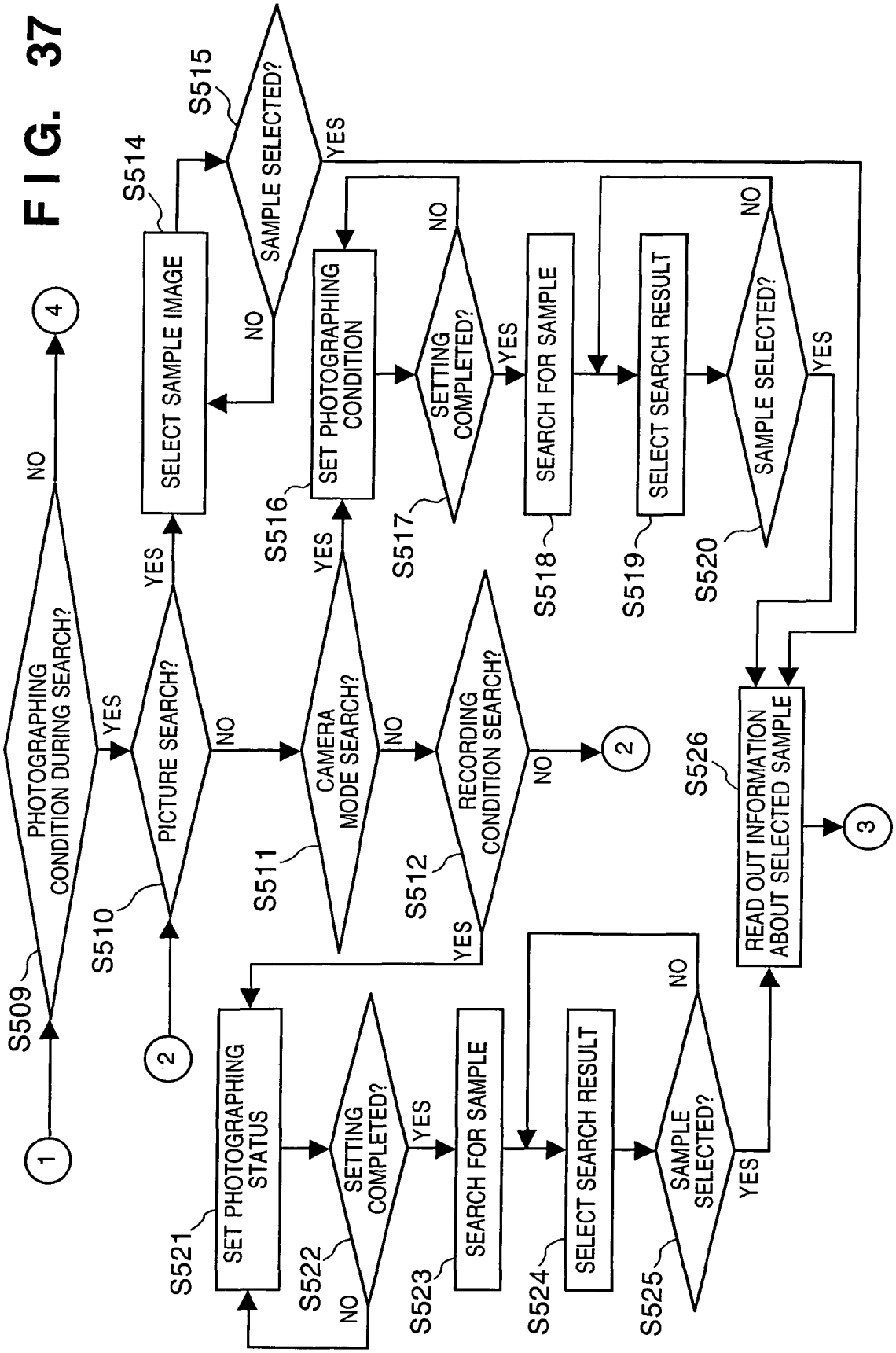
FIG. 37 is a flowchart showing search processing in the second embodiment of the present invention.

FIG. 37 is a flowchart showing search processing. This search processing is called when the current mode is not the sample selection mode (NO at step S501 or S502 in FIG. 36; ①). At step S509, whether the photographing condition is being searched for is checked.

If YES at step S509, whether the photographing condition is searched for by an image search, photographing condition search, or photographing status search is checked at steps S510, S511, and S512. If the photographing condition is searched for by an image search (YES at step S510), the flow shifts to step S514 to select a sample image. Upon completion of selection (YES at step S515), the image information, photographing condition information, and photographing status information of the selected sample are read out from the memory to display the search result window 1302 (step S526).

If the photographing condition is searched for by a photographing condition search (YES at step S511), the photographing condition to be searched for is set. Upon completion of setting (steps S516 and S517), samples corresponding to the set photographing condition are searched for at step S518. If one of the searched samples is selected (steps S519 and S520), the image information, photographing condition information, and photographing status information of the selected sample are read out from the memory at step S526 to display the search result window 1302.

If the photographing condition is searched for by a photographing status search (YES at step S512), a photographing status to be searched for is set at step S521. Upon completion of setting (YES at step S522), samples corresponding to the set photographing status are searched for at step S523. If one of the searched samples is selected (steps S524 and S525), the image information, photographing condition information, and photographing status information of the selected sample are read out from the memory at step S526 to display the search result window 1302.

Figure 38:
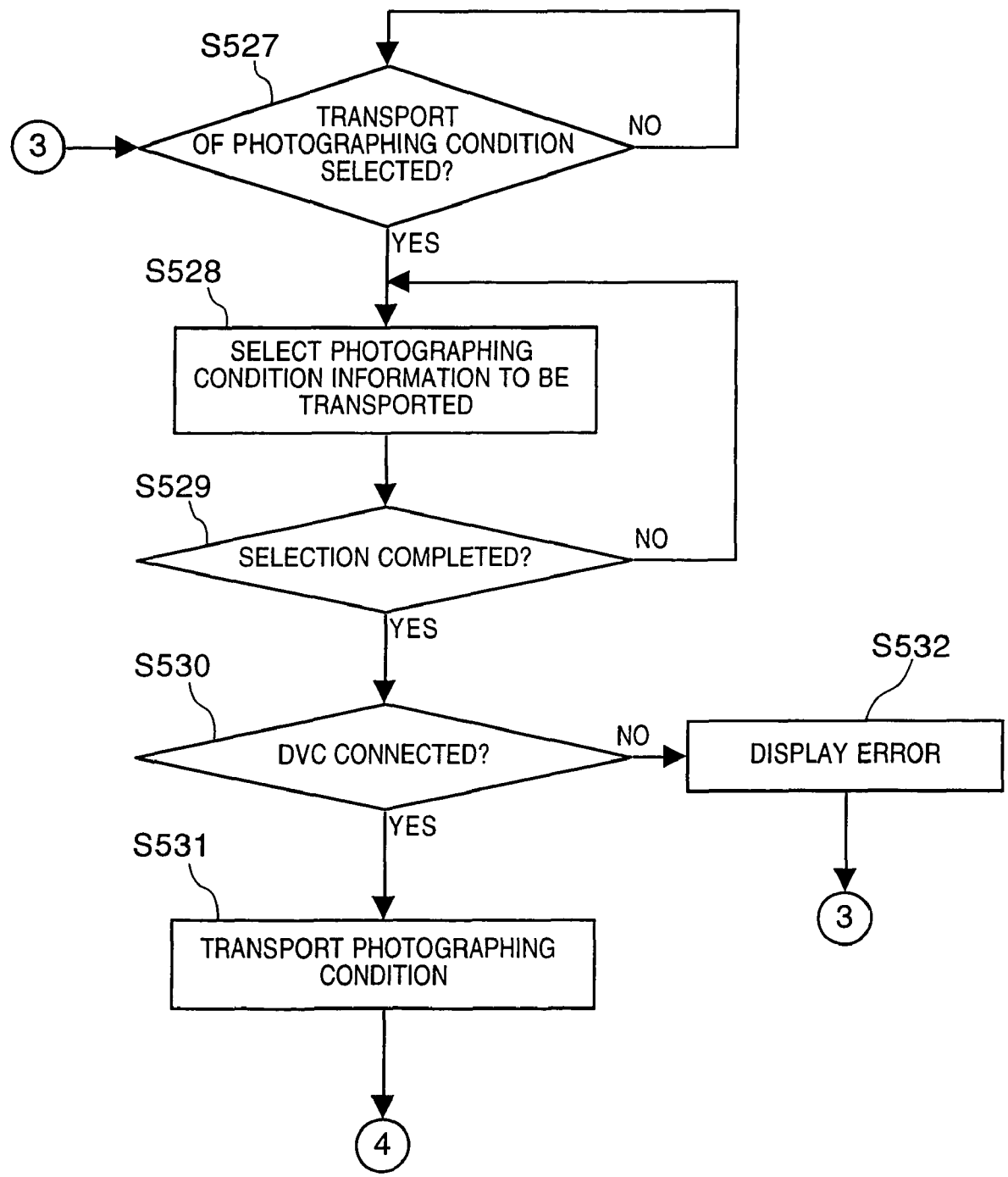
FIG. 38 is a flowchart showing processing for transporting photographing condition information to a DVC.

FIG. 38 is a flowchart showing control of transporting searched photographing condition information to the DVC. The mode shifts to a transport mode when processing at step S526 is completed and a photographing condition transport request is issued (YES at step S527). If a transport request is issued, photographing condition information to be transported in the manner described with reference to FIG. 35B is selected at step S528, and then selection ends (YES at step S529). Whether the PC is connected to the DVC is checked at step S530, and the selected photographing condition is transported to the DVC at step S531.

According to the second embodiment, an optimal photographing condition can be selected and set in the video camera. This facilitates setting of the photographing condition. Since several photographing conditions are stored in the memory of the video camera in advance, a photographer can take a picture under photographing conditions suitable to respective photographing environments.

Third Embodiment

The third embodiment of the present invention applied to a camera-integrated VTR which can be controlled by a computer will be described.

Figure 39:
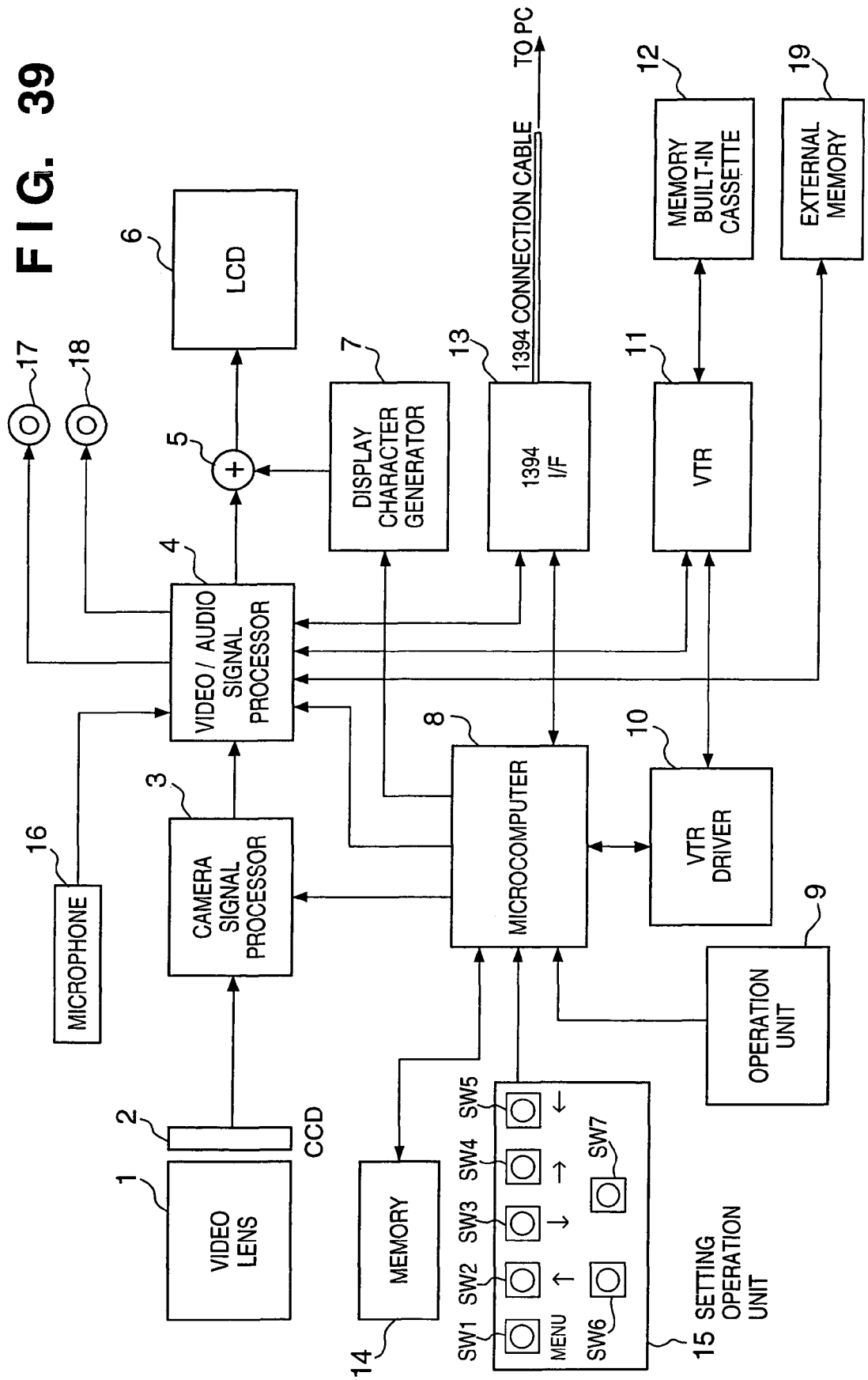
FIG. 39 is a block diagram showing the arrangement of a camera-integrated VTR in the third embodiment of the present invention.

FIG. 39 is a block diagram showing the arrangement of the camera-integrated VTR according to the third embodiment of the present invention.

In FIG. 39, reference numeral 1 denotes a lens for focusing light from an object to be photographed; 2, a CCD serving as an image sensor for converting the optical image of the object focused by the lens 1 into an electrical signal; and 3, a camera signal processor which performs camera signal processing for the electrical signal output from the CCD 2 to output a video signal, and can change setting values such as video color tone, color density, brightness, shutter speed in photographing, and f-number in accordance with an instruction from a microcomputer 8.

Reference numeral 4 denotes a video-audio signal processor. In photographing, the video-audio signal processor 4 processes a video signal output from the camera signal processor 3 and an audio signal from a microphone 16 in accordance with an instruction from the microcomputer 8 to output a recording signal to a video tape recorder (VTR) 11, and an image confirmation video signal to a liquid crystal display (LCD) 6. The video-audio signal processor 4 outputs a video signal to a video output terminal 17, and an audio signal to an audio output terminal 18. In playback, the video-audio signal processor 4 processes a signal played back from a magnetic tape by the VTR 11 to output a playback image confirmation video signal to the LCD 6, outputs a playback video signal to the video output terminal 17, and a playback audio signal to the audio output terminal 18. At the same time, the video-audio signal processor 4 supplies to a 1394 I/F 13 a video signal and audio signal to be converted into a digital signal output.

Reference numeral 5 denotes a combination circuit for combining a character signal output from a display character generator 7 to a video signal output from the video•audio signal processor 4, and supplying the combined signal to the LCD 6. The LCD 6 displays the video signal to which the character signal is combined. The display character generator 7 generates a character signal under the control of the microcomputer 8. The microcomputer 8 controls the whole operation of the camera-integrated VTR, and when the VTR is connected to an external device via a 1394 cable, receives a command from the external device via the 1394 I/F 13 to perform control of changing the adjustment value of the camera.

Reference numeral 9 denotes an operation unit for operating the camera-integrated VTR; and 10, a VTR driver for operating the VTR 11 in accordance with an instruction from the microcomputer 8. The VTR 11 records/plays back a recording signal on/from a recording medium such as a magnetic tape stored in a memory built-in cassette 12, and comprises a contact between the memory of the memory built-in cassette 12 and the communication line of the microcomputer 8. The memory built-in cassette 12 incorporates a magnetic tape and a nonvolatile memory capable of recording data by communication with the microcomputer 8. The 1394 I/F 13 connects an external device. Reference numeral 14 denotes a memory for storing predetermined data under control of the microcomputer 8.

Reference numeral 15 denotes a setting operation unit for operating settings such as the camera image quality. Reference symbol SW1 denotes a menu switch for entering or exiting from a setting mode for the camera image quality and the like; SW2, an UP switch for moving up the first cursor (to be described later) shown in FIG. 40; SW3, a DOWN switch for moving the first cursor down; SW4, a RIGHT switch for moving right the second cursor (to be described later) shown in FIG. 40; SW5, a LEFT switch for moving the second cursor left; SW6, a data increment switch for incrementing data designated by the first and second cursors; and SW7, a data decrement switch for decrementing data designated by the first and second cursors.

The microphone 16 converts a sound in photographing into an electrical signal, and supplies the signal to the video-audio signal processor 4. The video output terminal 17 supplies a video signal output from the video-audio signal processor 4 to an external device. The audio output terminal 18 supplies an audio signal output from the video-audio signal processor 4 to an external device. Reference numeral 19 denotes an external memory which stores data by communication with the microcomputer 8, and is detachably mounted in the camera-integrated VTR.

Figure 40:
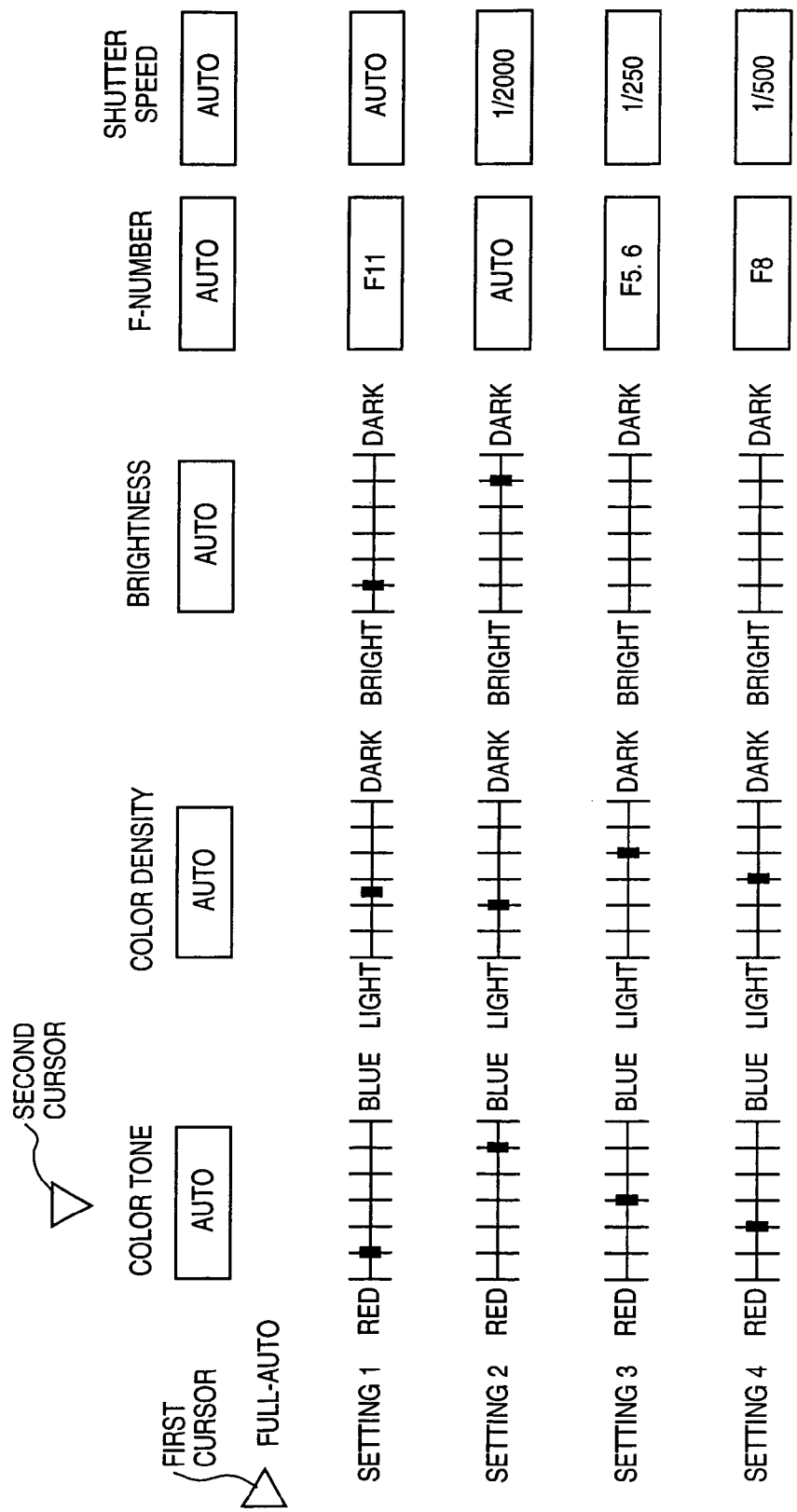
FIG. 40 is a view showing an example of a display screen for setting the camera control value in the third embodiment of the present invention.

In the third embodiment, a plurality of sets of arbitrarily set control values (camera control values) such as exposure values, shutter speeds, and values for white balances can be held. By selecting one set from the plurality of held sets, the selected set of camera control values can be automatically set in the camera-integrated VTR. FIG. 40 shows an example of the camera control value setting window when four sets of camera control values, i.e., setting 1 to setting 4 are held. A set of camera control values selected by the first cursor are set in the camera-integrated VTR. Note that the contents of each set of camera control values can be changed.

The operation of the camera-integrated VTR having the above arrangement according to the third embodiment will be explained in detail with reference to FIGS. 40 and 41.

Figure 41:
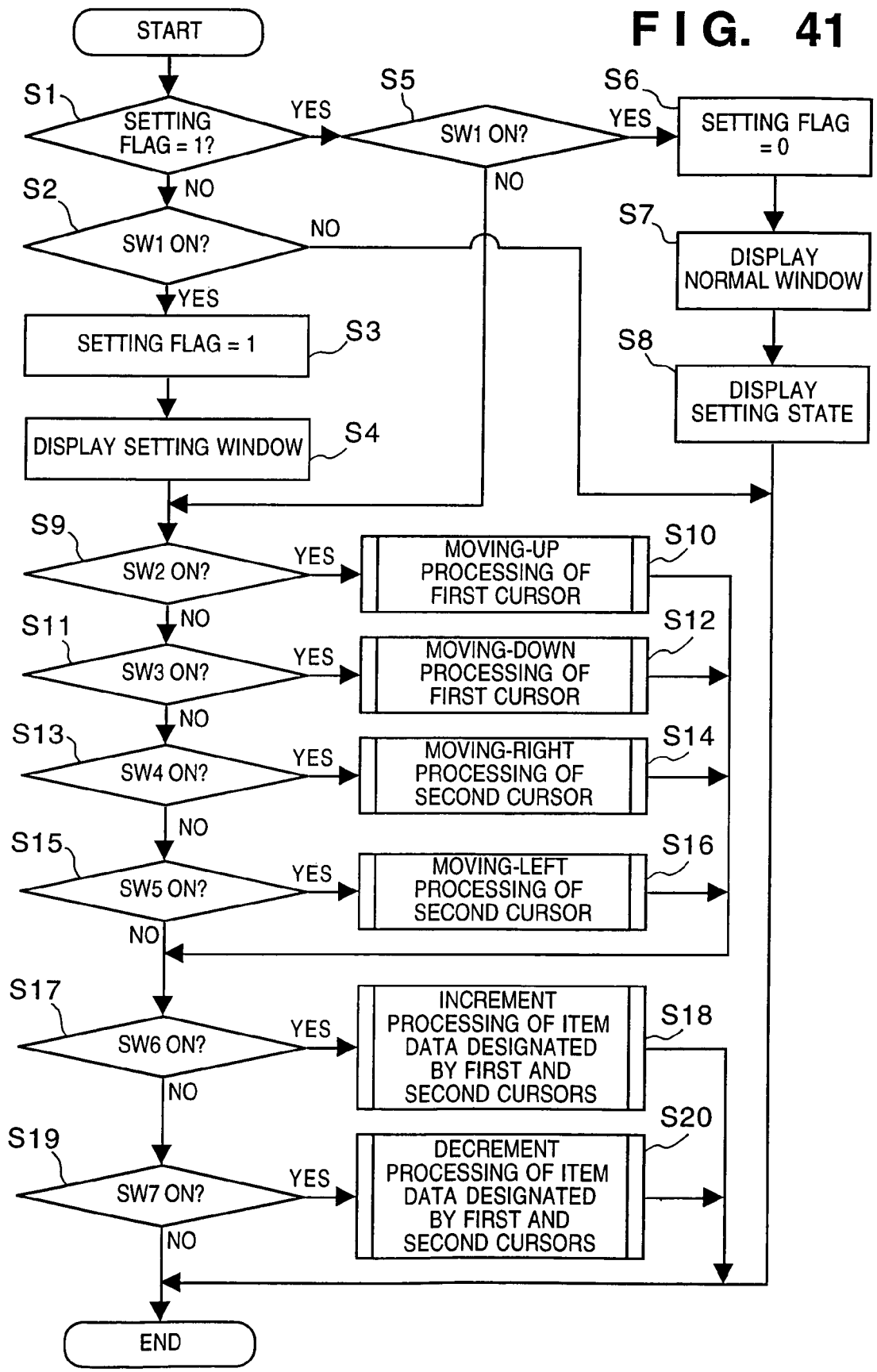
FIG. 41 is a flowchart showing setting operation according to the third embodiment of the present invention.

FIG. 41 is a flowchart showing operation of changing the setting value such as the camera image quality. The operation shown in this flowchart is repeated at predetermined intervals determined by the control of the microcomputer 8.

When processing starts, whether the camera-integrated VTR is setting the camera control value is checked at step S1. If the setting flag is 1, "during setting" is determined, and the processing shifts to step S5; or if the setting flag is 0, to step S2.

At step S2, whether the menu switch SW1 is clicked is checked. If YES at step S2, it is determined to enter the camera control value setting mode, and the flow advances to step S3; or if NO, this processing ends.

At step S3, a setting flag for declaring "during the camera control value setting mode" is set to 1, and the flow advances to step S4. A window, like the one shown in FIG. 40, for setting the camera image quality and the like is displayed, and the flow shifts to step S9.

At step S9, whether the switch SW2 for moving up the first cursor shown in FIG. 40 is clicked is checked. If NO at step S9, the flow shifts to step S11; or if YES, to step S10.

At step S10, the first cursor position value for designating the first cursor position is incremented, and the first cursor is moved to the position designated by this value. Camera control values are changed in accordance with the setting state of a set of camera control values designated by the first cursor shown in FIG. 40. Since setting change of the camera control values may spend a long time, the first cursor is kept flickering till completion of setting change. However, if the first cursor is at a moving limit position, the flow advances to step S17 without changing the first cursor position value.

At step S11, whether the switch SW3 for moving the first cursor down is clicked is checked. If NO at step S11, the flow shifts to step S13; or if YES, to step S12.

At step S12, the first cursor position value is decremented, and the first cursor is moved to the position designated by this value. Camera control values are changed in accordance with the setting state of a set of camera control values designated by the first cursor shown in FIG. 40. Since setting change of the camera control values may spend a long time, the first cursor is kept flickering till completion of setting change. However, if the first cursor is at a moving limit position, the flow advances to step S17 without changing the first cursor position value.

At step S13, whether the switch SW4 for moving the second cursor right is clicked is checked. If NO at step S13, the flow shifts to step S15; or if YES, to step S14.

At step S14, the second cursor position value is incremented, and the second cursor is moved to the position designated by this value. However, if the second cursor is at a moving limit position, the flow advances to step S17 without changing the second cursor position value.

At step S15, whether the switch SW5 for moving the second cursor left is clicked is checked. If NO at step S15, the flow shifts to step S17; or if YES, to step S16.

At step S16, the second cursor position value is incremented, and the second cursor is moved to the position designated by this value. However, if the second cursor is at a moving limit position, the flow advances to step S17 without changing the second cursor position value.

At step S17, whether the switch SW6 for incrementing data designated by the first and second cursors is clicked is checked. If NO at step S17, the flow advances to step S19; or if YES, to step S18.

At step S18, the camera control value corresponding to an item designated by the first and second cursors is incremented, and the display is changed in accordance with the camera control value corresponding to the designated item. At the same time, the settings of the camera-integrated VTR are changed in accordance with the camera control value corresponding to the designated item. Since setting change of the camera control value may spend a long time, the first cursor is kept flickering till completion of setting change. However, if the designated item has a setting limit value, the flow advances to step S19 without changing the camera control value corresponding to the designated item.

At step S19, whether the switch SW7 for decrementing data designated by the first and second cursors is clicked is checked. If NO at step S19, this processing ends; or if YES, the flow advances to step S20.

At step S20, the camera control value corresponding to an item designated by the first and second cursors is decremented, and the display is changed in accordance with the camera control value corresponding to the designated item. At the same time, the settings of the camera-integrated VTR are changed in accordance with the camera control value corresponding to the designated item. Since setting change of the camera control value may spend a long time, the first cursor is kept flickering till completion of setting change. However, if the designated item has a setting limit value, this processing ends without changing the camera control value corresponding to the designated item.

Figure 42:
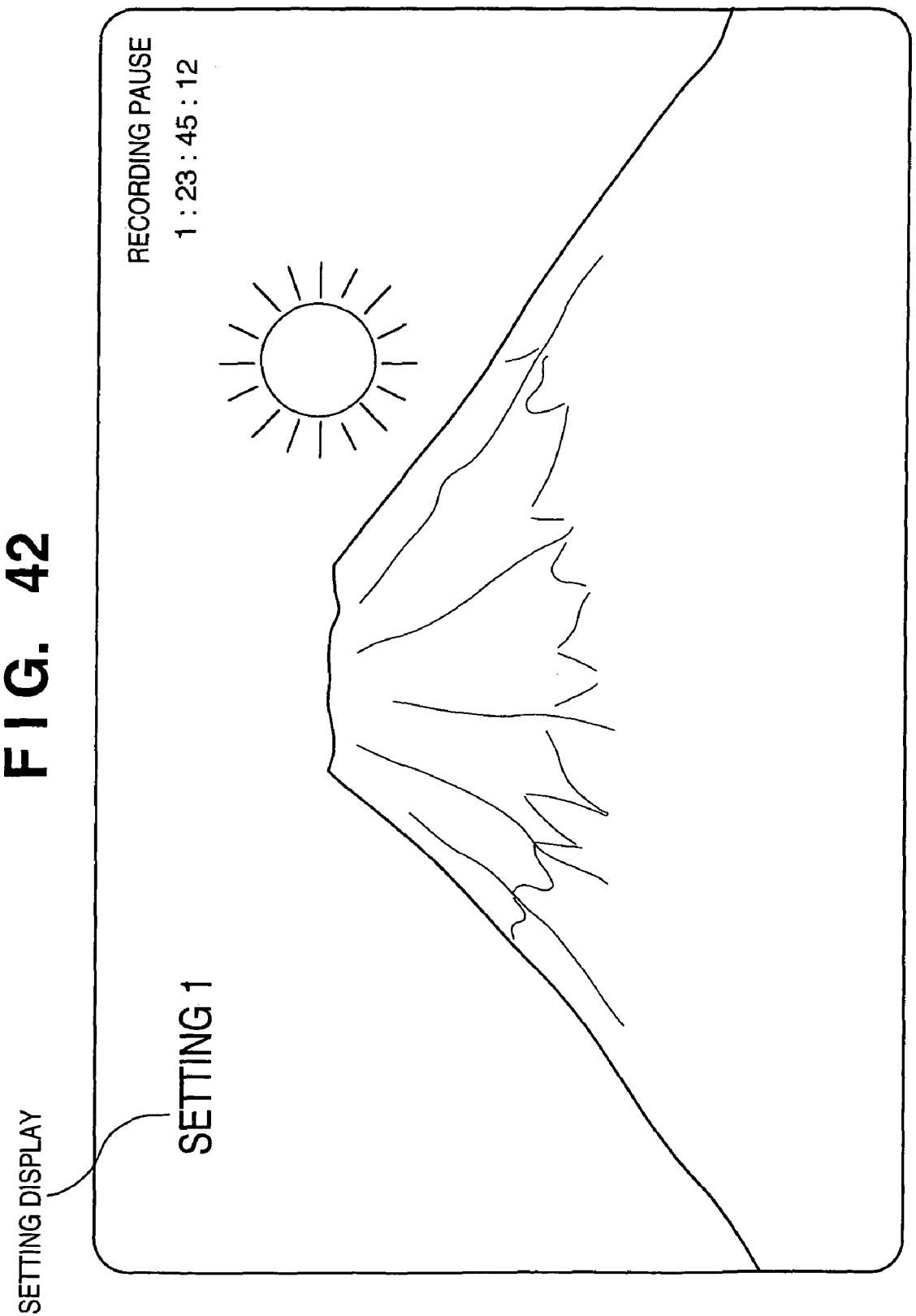
FIG. 42 is a view showing a display example in normal operation.

On the other hand, if "during setting" is determined from the setting flag indicating 1 at step S1, and the flow shifts to step S5, whether the switch SW1 for entering or exiting from the setting mode is clicked is checked. If NO at step S5, "during setting" is determined again, and the flow shifts to step S9 to perform the above-described operations at steps S9 to S19. If YES at step S5, it is determined to exit from the setting mode, and the flow advances to step S6. The flag for declaring the setting mode for the camera image quality and the like is set to 0, and the setting mode for the camera image quality and the like ends. The display is returned to a normal window display in FIG. 42 at step S7, and the flow advances to step S8. At step S8, the setting state of camera control values designated by the first cursor is displayed as shown in FIG. 42, and the processing ends.

According to the third embodiment, each set includes a plurality of control data such as the exposure value, shutter speed, and white balance, and a plurality of sets of control data can be set and held. Thus, control data need not be reset every photographing. For example, in photographing under a previously set photographing condition, the set of this photographing condition can be selected to automatically set the photographing condition of the selected set in the camera without resetting respective control data.

Fourth Embodiment

In the fourth embodiment, the camera control value is changed from an external device in the arrangement of the third embodiment.

In this case, a personal computer is used as the external device, and an IEEE 1394 serial bus is used as a digital I/F for connecting the personal computer. The IEEE 1394 serial bus has already been described in the first embodiment, and a description thereof will be omitted.

The operation of the system according to the fourth embodiment of the present invention will be explained with reference to FIGS. 43 and 44.

FIG. 43 is a block diagram showing the arrangement of a personal computer (PC) serving as a control apparatus of an image sensing apparatus according to the fourth embodiment of the present invention that is connected as an external device.

In FIG. 43, reference numeral 101 denotes a display; 102, a hard disk; 103, a memory; 104, an MPU of an arithmetic processor; 105, a PCI bus; 106, an operation unit such as a keyboard and mouse; 107, a 1394 serial bus I/F connected via a 1394 cable to the camera-integrated VTR of the third embodiment shown in FIG. 39; and 108, a power supply.

The PC having this arrangement is connected to the camera-integrated VTR shown in FIG. 39 via the 1394 cable, and VTR control software starts on the PC. Then, a display as shown in FIG. 44 appears on the display. This display allows changing settings such as the camera picture and the like from the PC.

Some of communication contents between the PC and camera-integrated VTR that relate to the fourth embodiment will be described.

<Communication Contents>
Setting Position Information
Camera-Integrated VTR→PC
    Settable Count
    Current Setting Position
PC→Camera-Integrated VTR
    Setting Change Position
    Data Information Of Each Item For Each Setting
Camera-Integrated VTR→PC
    Setting Items (Color Tone, Color Density, F-Number, . . . )
    Setting Range And Corresponding Type Of Each Setting Item
    Address Of Each Setting Item
    Current Setting Data Of Each Item
PC→Camera-Integrated VTR
    Address Of Each Setting Item
    Setting Data Of Each Item
    Setting Status Information
Camera-Integrated VTR→PC
    Information During Setting Change
PC→Camera-Integrated VTR
    Setting Mode Change Request Operation of changing settings such as the camera picture of the camera-integrated VTR from the PC by exchanging the above communication contents will be explained.

When VTR control software starts on the PC, the camera-integrated VTR starts communicating with the PC. When the PC transmits a "setting mode change request", the camera-integrated VTR enters the setting mode for the camera image quality and the like, and transmits, to the PC, data "settable count", "current setting position", "setting items", "setting range and corresponding type of each setting item", "address of each setting item", "current setting data of each item", and "information during setting change".

Figure 44:
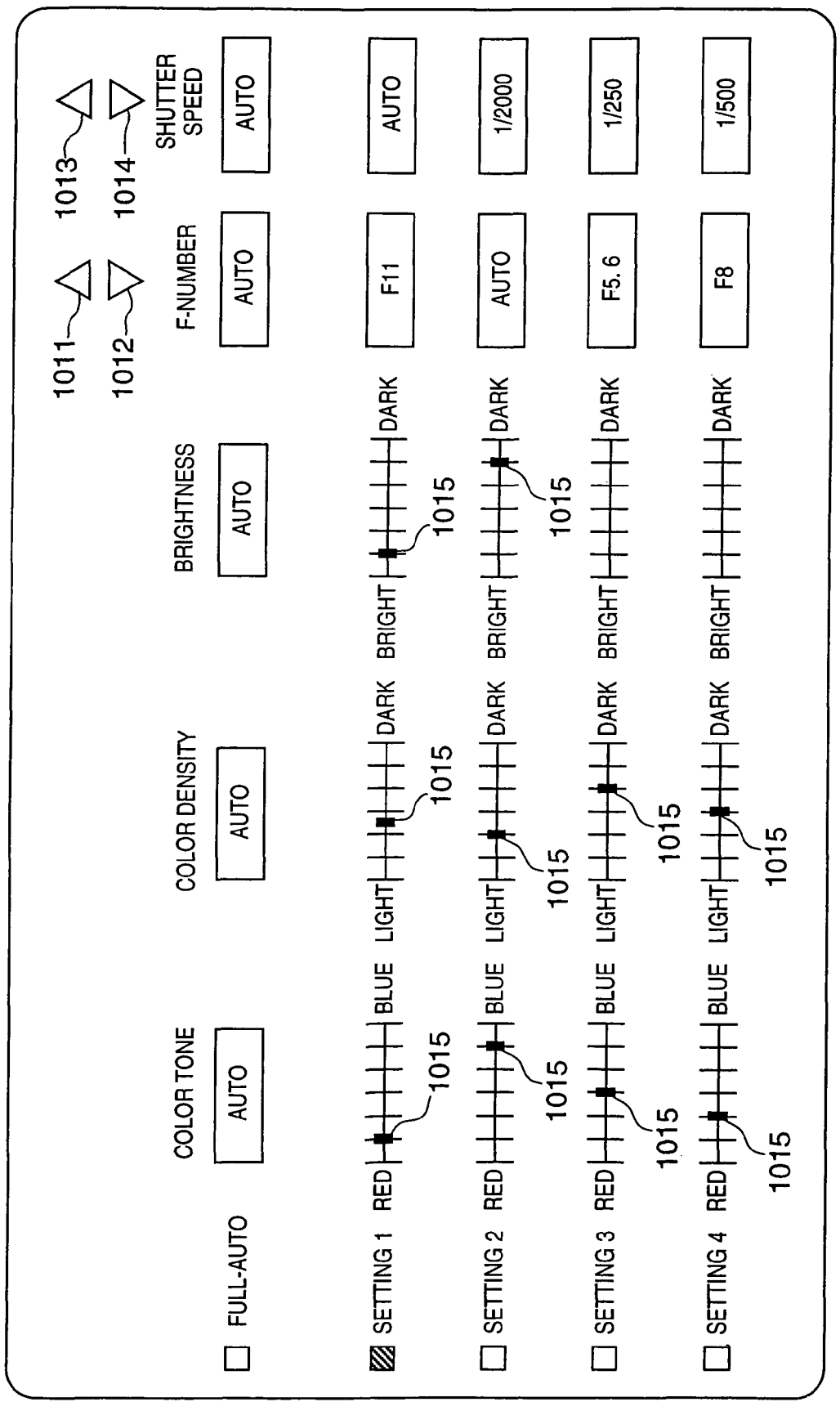
FIG. 44 is a view showing an example of a graphical user interface displayed on the display of the personal computer in setting the camera control value in the fourth embodiment of the present invention.

The PC receives these data, and displays a graphical user interface (GUI) as shown in FIG. 44 on the display 101 to complete preparation for setting change of the camera picture.

If any one of a plurality of setting choices (full-auto and setting 1 to setting 4 in FIG. 44) is clicked with a mouse or the like, the PC transmits the clicked setting change position data to change settings such as the camera picture to the setting status of the clicked setting position. The camera-integrated VTR displays "during setting change" on an LCD 6 till completion of change, and transmits "during setting change" to the PC which displays it on the display 101. To change the setting item of each choice, the setting value is changed by clicking UP buttons 1011 and 1013 and DOWN buttons 1012 and 1014, and drugging a pointer 1015 of the GUI displayed on the display 101.

The changed setting item data is transmitted from the PC to the camera-integrated VTR. The camera-integrated VTR can change settings such as the camera picture in accordance with the transmitted data.

According to the fourth embodiment, control data can be set and changed from an external device, in addition to the effects of the third embodiment. This facilitates camera operation.

Note that the camera control value is stored in the memory 103 of the PC, but may be stored in another storage device.

For example, the camera control data may be stored in the memory of the memory built-in cassette 12 or recorded on a recording medium such as a magnetic tape. In this case, the number of camera setting states can be increased regardless of the memory capacity of the microcomputer, and the image sensing apparatus main body and microcomputer need not be equipped with any memories.

In the third and fourth embodiments, the present invention is applied to the camera-integrated VTR. However, the present invention can be applied to various image sensing apparatuses.

The present invention is not limited to the above embodiments and various changes and modifications can be made within the spirit and scope of the present invention. Therefore, to appraise the public of the scope of the present invention, the following claims are made.

What is claimed is:

1. A control apparatus for controlling an image sensing apparatus comprising:
    a receiving unit adapted to receive an image and a set of photographing conditions sent from the image sensing apparatus, the image being sensed by the image sensing apparatus and the set of photographing conditions being photographing conditions of the image sensing apparatus when the image sensing apparatus sensed the image;
    a setting unit adapted to set a photographing status corresponding to the image received by said receiving unit, the photographing status including information of a place where the image was sensed;
    a memory adapted to store a plurality of sample information each of which is formed by associating the image, the set of photographing conditions and the photographing status;
    a search unit adapted to search for sample information corresponding to the photographing status set by a user from the plurality of sample information stored in said memory;
    a selection unit adapted to select from the photographing conditions associated with the sample information searched by said search unit one or more photographing conditions to be transferred to the image sensing apparatus; and
    a transfer unit adapted to transfer to the image sensing apparatus the one or more photographing conditions selected by said selection unit.

2. A method of managing photographing conditions of an image sensing apparatus connected to a computer, comprising:
    a receiving step of receiving an image and a set of photographing conditions sent from the image sensing apparatus, the image being sensed by the image sensing apparatus and the set of photographing conditions being photographing conditions of the image sensing apparatus when the image sensing apparatus sensed the image;
    a setting step of setting a photographing status corresponding to the image received in said receiving step, the set of photographing status including information of a place where the image was sensed;
    a storing step of storing a plurality of sample information each of which is formed by associating the image, the set of photographing conditions and the photographing status;
    a search step of searching for sample information corresponding to the photographing status set by a user from the plurality of sample information stored in said storing step;

a selection step of selecting from the photographing conditions associated with the sample information searched by said search unit one or more photographing conditions to be transferred to the image sensing apparatus; and a transfer step of transferring to the image sensing apparatus the one or more photographing conditions selected in said selection step.

* * * * *